(12) United States Patent
Sadai et al.

(10) Patent No.: US 11,965,665 B2
(45) Date of Patent: Apr. 23, 2024

(54) AIR CONDITIONING SYSTEM

(71) Applicant: DAIKIN INDUSTRIES, LTD., Osaka (JP)

(72) Inventors: Shizuka Sadai, Osaka (JP); Akihiro Inao, Osaka (JP); Shuji Fujimoto, Osaka (JP); Shinichi Kasahara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 405 days.

(21) Appl. No.: 17/439,897

(22) PCT Filed: Mar. 13, 2020

(86) PCT No.: PCT/JP2020/011289
§ 371 (c)(1),
(2) Date: Sep. 16, 2021

(87) PCT Pub. No.: WO2020/189588
PCT Pub. Date: Sep. 24, 2020

(65) Prior Publication Data
US 2022/0186965 A1 Jun. 16, 2022

(30) Foreign Application Priority Data
Mar. 19, 2019 (JP) ................. 2019-051642

(51) Int. Cl.
*F24F 11/63* (2018.01)
*G05D 23/19* (2006.01)

(52) U.S. Cl.
CPC .......... *F24F 11/63* (2018.01); *G05D 23/1917* (2013.01)

(58) Field of Classification Search
CPC ........ F24F 11/62; F24F 11/63; G05D 23/1917
See application file for complete search history.

(56) References Cited

U.S. PATENT DOCUMENTS

| 2015/0100163 A1 | 4/2015 | Allmaras et al. |
| 2020/0149771 A1* | 5/2020 | Sinha ............... F24F 11/64 |

FOREIGN PATENT DOCUMENTS

| JP | 2008-249234 A | 10/2008 |
| JP | 5334909 B2 | 11/2013 |

(Continued)

OTHER PUBLICATIONS

International Search Report, issued in PCT/JP2020/011289, dated Jun. 9, 2020.

(Continued)

*Primary Examiner* — Mark A Connolly
(74) *Attorney, Agent, or Firm* — Birch, Stewart, Kolasch & Birch, LLP

(57) ABSTRACT

An air conditioning system includes an air conditioning apparatus, and a controller. The air conditioning apparatus performs air conditioning of an air-conditioning target space. The controller is connectable to a plurality of types of thermostats. The controller performs communication with the thermostat connected thereto. The controller performs a performance determination process for the refrigeration cycle apparatus. The controller performs different performance determination processes according to whether a first type of thermostat is connected thereto unit or whether a second type of thermostat is connected thereto. Alternatively, the air conditioning apparatus changes a method for using information received by the controller from the thermostat according to whether being in a determination processing time over which the performance determination process is performed or in a non-determination processing time over which the performance determination process is not performed.

16 Claims, 12 Drawing Sheets

(56) References Cited

FOREIGN PATENT DOCUMENTS

| JP | 2015-218940 A | 12/2015 |
|---|---|---|
| JP | 2016-533468 A | 10/2016 |

OTHER PUBLICATIONS

Extended European Search Report for European Application No. 20773278.5, dated Nov. 8, 2022.
International Preliminary Report on Patentability and Written Opinion of the International Searching Authority for International Application No. PCT/JP2020/011289, dated Sep. 30, 2021.

* cited by examiner

AIR CONDITIONING SYSTEM

TECHNICAL FIELD

The present disclosure relates to an air conditioning system including a refrigeration cycle apparatus.

BACKGROUND ART

In some cases, a thermostat for transmitting an operation command or a stop command to an air conditioning system including a refrigeration cycle apparatus or setting the operating conditions of the air conditioning system may be disposed separately from the air conditioning system.

Multiples types of thermostats that differ in function are available on the market. In many cases, an air conditioning system can be connected to a plurality of types of thermostats and is configured to be capable of receiving a signal from a thermostat connected thereto.

SUMMARY OF INVENTION

Technical Problem

As disclosed in PTL 1 (Japanese Patent No. 5334909), a technique has been known for controlling the operating state of a refrigeration cycle apparatus to be under a predetermined condition and determining the performance of the refrigeration cycle apparatus on the basis of a value such as the degree of subcooling.

In an air conditioning system to which a plurality of types of thermostats are connectable, in a case where the performance of a refrigeration cycle apparatus is determined using such a technique, the content of a performance determination process for the refrigeration cycle apparatus may not be appropriate when a certain thermostat is connected to the air conditioning system. In addition, in a case where the performance of a refrigeration cycle apparatus is determined in an air conditioning system to which a thermostat is connectable, a command from the thermostat may hamper the performance determination process.

Solution to Problem

An air conditioning system according to a first aspect includes a refrigeration cycle apparatus, a connection unit, a communication unit, and a determination processing unit. The refrigeration cycle apparatus performs air conditioning of an air-conditioning target space. The connection unit is connectable to a plurality of types of thermostats. The communication unit performs communication with the thermostat connected to the connection unit. The determination processing unit performs a performance determination process for the refrigeration cycle apparatus. (A) The determination processing unit performs different performance determination processes according to whether a first type of thermostat is connected to the connection unit or a second type of thermostat different from the first type of thermostat is connected to the connection unit. Alternatively, (B) the refrigeration cycle apparatus changes a method for using information received by the communication unit from the thermostat according to whether being in a determination processing time over which the performance determination process is performed or in a non-determination processing time over which the performance determination process is not performed.

In the air conditioning system according to the first aspect, it is possible to perform an appropriate performance determination process for the refrigeration cycle apparatus, regardless of information transmitted from a thermostat connected thereto.

An air conditioning system according to a second aspect is the air conditioning system according to the first aspect, in which the second type of thermostat is different from the first type of thermostat in terms of at least one of whether to transmit temperature information of the air-conditioning target space to the communication unit, whether to transmit humidity information of the air-conditioning target space to the communication unit, and whether to transmit temperature information of heat-source air of the refrigeration cycle apparatus to the communication unit.

In the air conditioning system according to the second aspect, it is possible to perform an appropriate performance determination process in accordance with the information transmitted from the thermostat connected thereto.

An air conditioning system according to a third aspect is the air conditioning system according to the first aspect or the second aspect, in which the second type of thermostat is different from the first type of thermostat in terms of whether to transmit information related to an operating state of an air conditioning device to the communication unit, the air conditioning device being different from the refrigeration cycle apparatus and configured to perform air conditioning of the same space as the air-conditioning target space.

In the air conditioning system according to the third aspect, it is possible to perform an appropriate performance determination process in accordance with whether the thermostat connected to the air conditioning system transmits the operating state of another air conditioning device connected to the thermostat.

An air conditioning system according to a fourth aspect is the air conditioning system according to any one of the first aspect to the third aspect, in which the second type of thermostat is different from the first type of thermostat in terms of whether to transmit information related to presence of a person in the air-conditioning target space to the communication unit.

In the air conditioning system according to the fourth aspect, it is possible to perform an appropriate performance determination process in accordance with whether the thermostat connected thereto notifies the presence of a person in the air-conditioning target space.

An air conditioning system according to a fifth aspect is the air conditioning system according to any one of the first aspect to the fourth aspect, in which the determination processing unit performs different performance determination processes according to whether the first type of thermostat is connected to the connection unit or the second type of thermostat is connected to the connection unit. The recitation "a certain performance determination process is different from another performance determination process" indicates that at least one of whether to perform a preparatory operation, content of the preparatory operation, a condition for starting the determination-process operation, a process flow of the performance determination process, and an item to be determined by the performance determination process is changed between them. The determination-process operation refers to an operation of the refrigeration cycle apparatus for performing the performance determination process. The preparatory operation refers to an operation of the refrigeration cycle apparatus performed before the determination-process operation is started.

In the air conditioning system according to the fifth aspect, since the performance determination process is changed in accordance with the type of thermostat connected thereto, it is possible to perform appropriate performance determination in accordance with the type of thermostat.

An air conditioning system according to a sixth aspect is the air conditioning system according to any one of the first aspect to the fifth aspect, in which in a case where the communication unit receives a refrigeration cycle stop command for the refrigeration cycle apparatus, the refrigeration cycle apparatus stops a refrigeration cycle operation in the non-determination processing time. In a case where the communication unit receives a refrigeration cycle stop command for the refrigeration cycle apparatus, the refrigeration cycle apparatus performs a determination-process operation in which the refrigeration cycle operation is not stopped in the determination processing time. The determination-process operation is an operation of the refrigeration cycle apparatus for performing the performance determination process.

In the air conditioning system according to the sixth aspect, the performance determination process can be executed without being hampered by a signal of a thermostat.

DESCRIPTION OF EMBODIMENTS

An embodiment of an air conditioning system according to the present disclosure will be described with reference to the drawings.

(1) Overall Configuration

Figure 1:
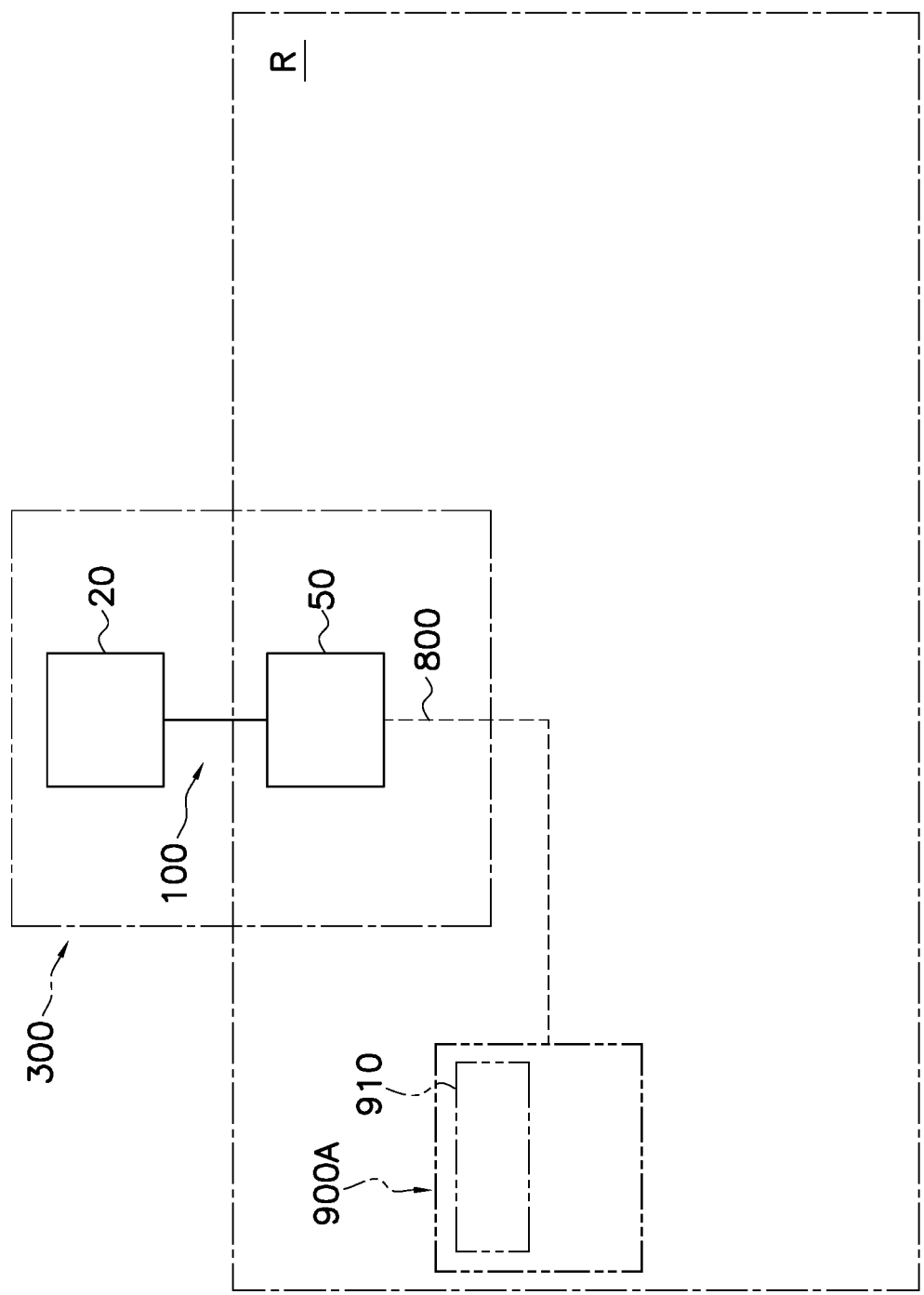
FIG. 1 is a block diagram of an air conditioning system according to an embodiment of the present disclosure and a first thermostat connected to the air conditioning system.
Figure 2:
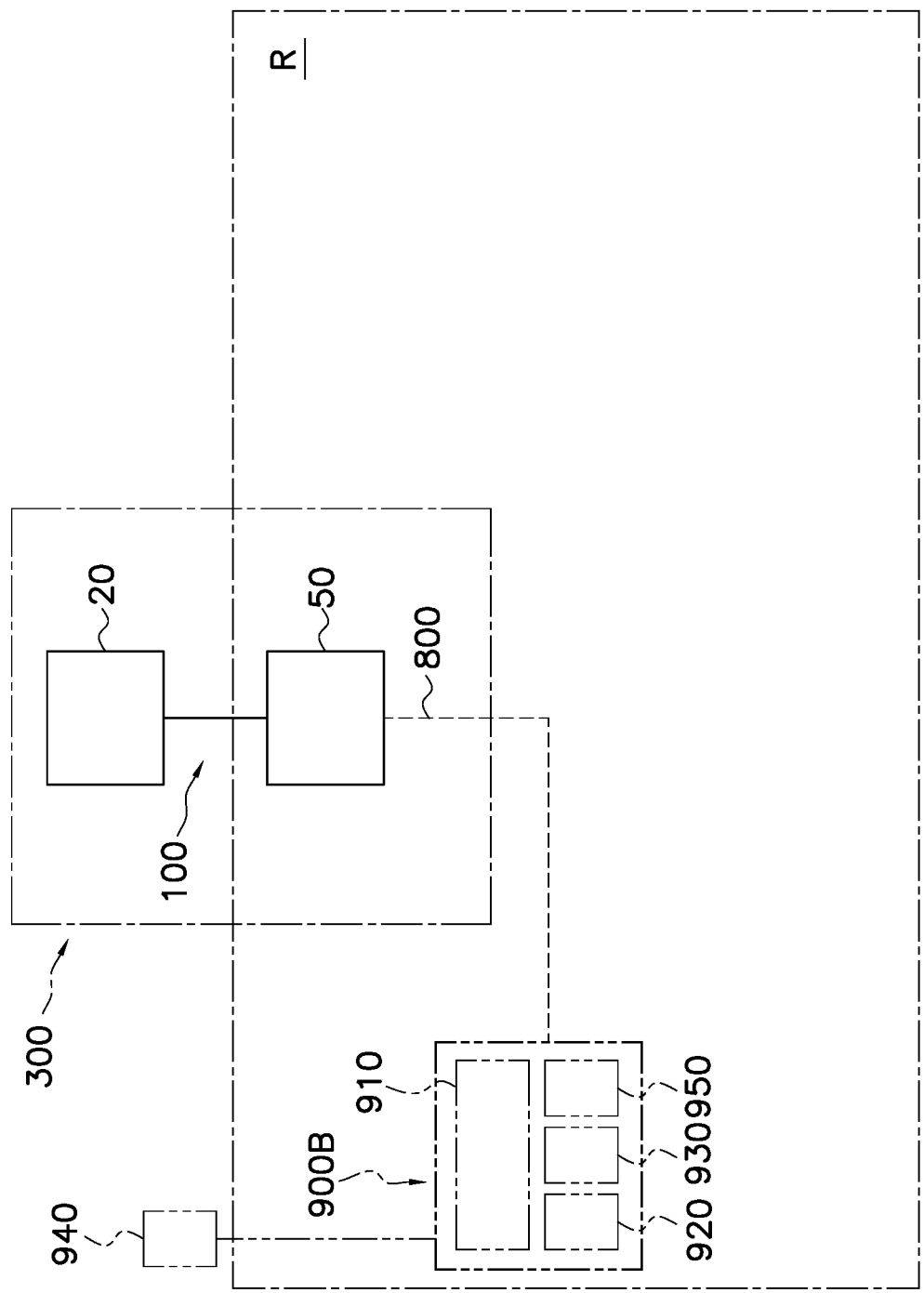
FIG. 2 is a block diagram of the air conditioning system in FIG. 1 and a second thermostat connected to the air conditioning system.
Figure 3:
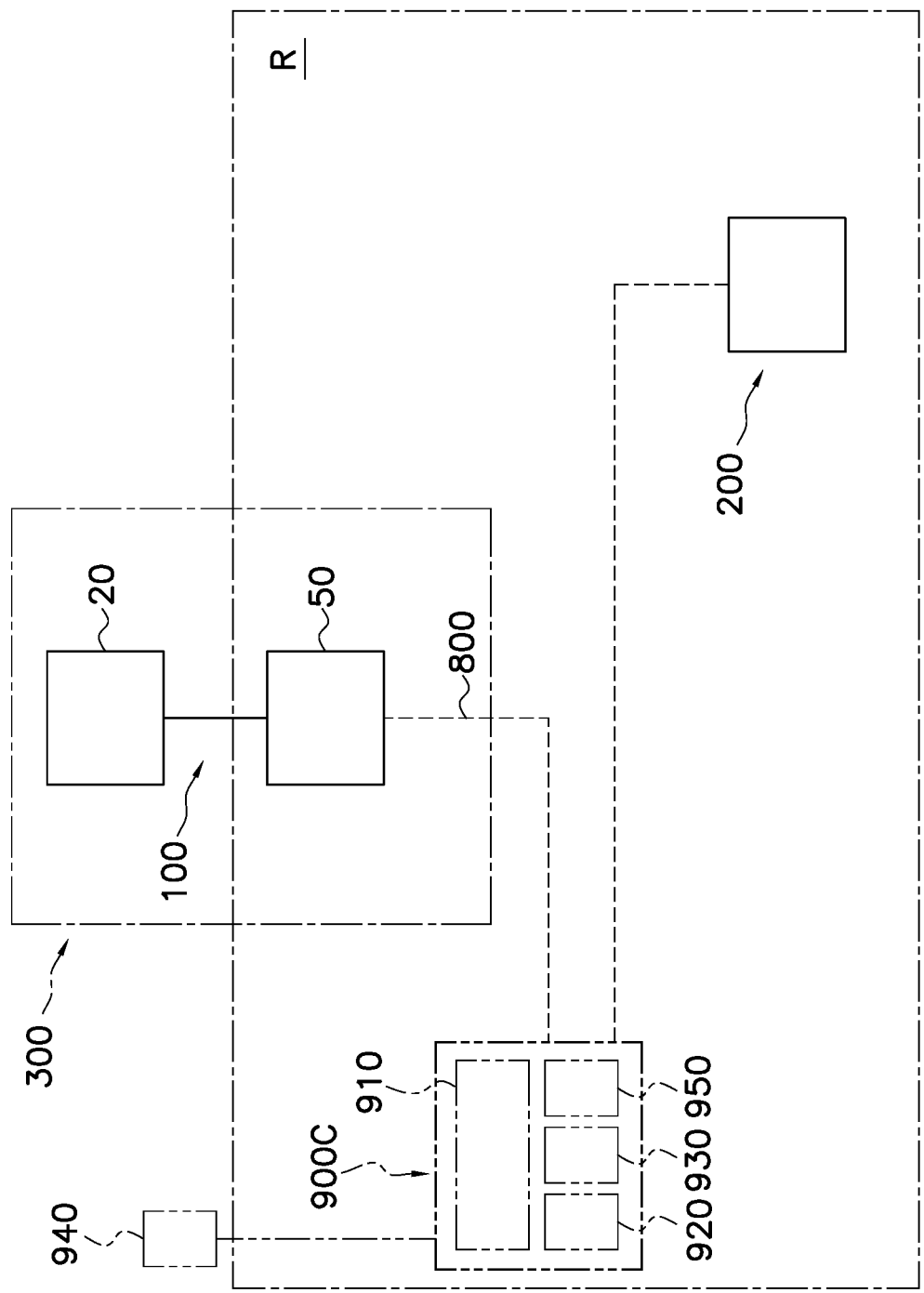
FIG. 3 is a block diagram of the air conditioning system in FIG. 1 and a third thermostat connected to the air conditioning system.
Figure 4:
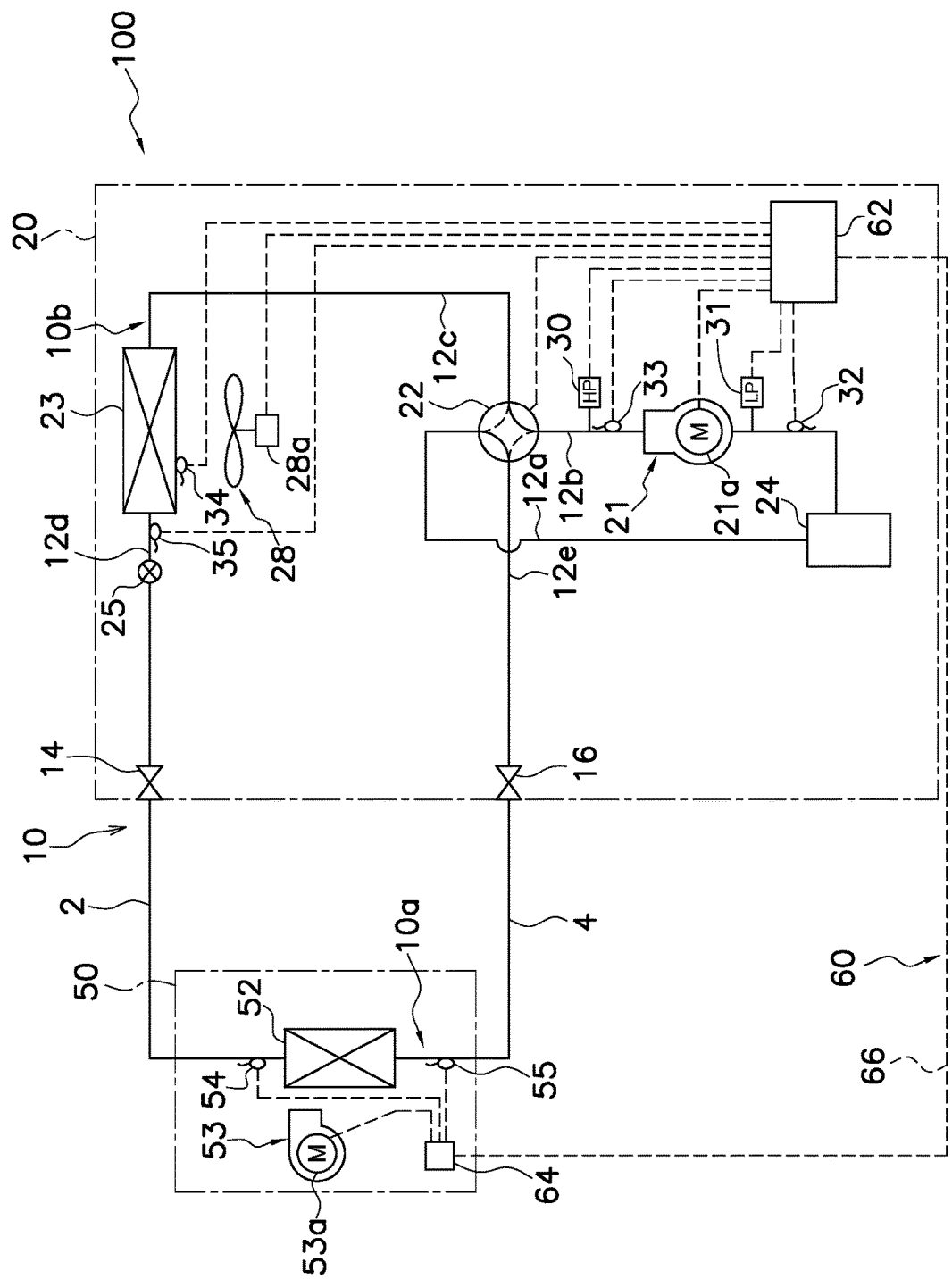
FIG. 4 is a schematic configuration diagram of an air conditioning apparatus included in the air conditioning system in FIG. 1.
Figure 5:
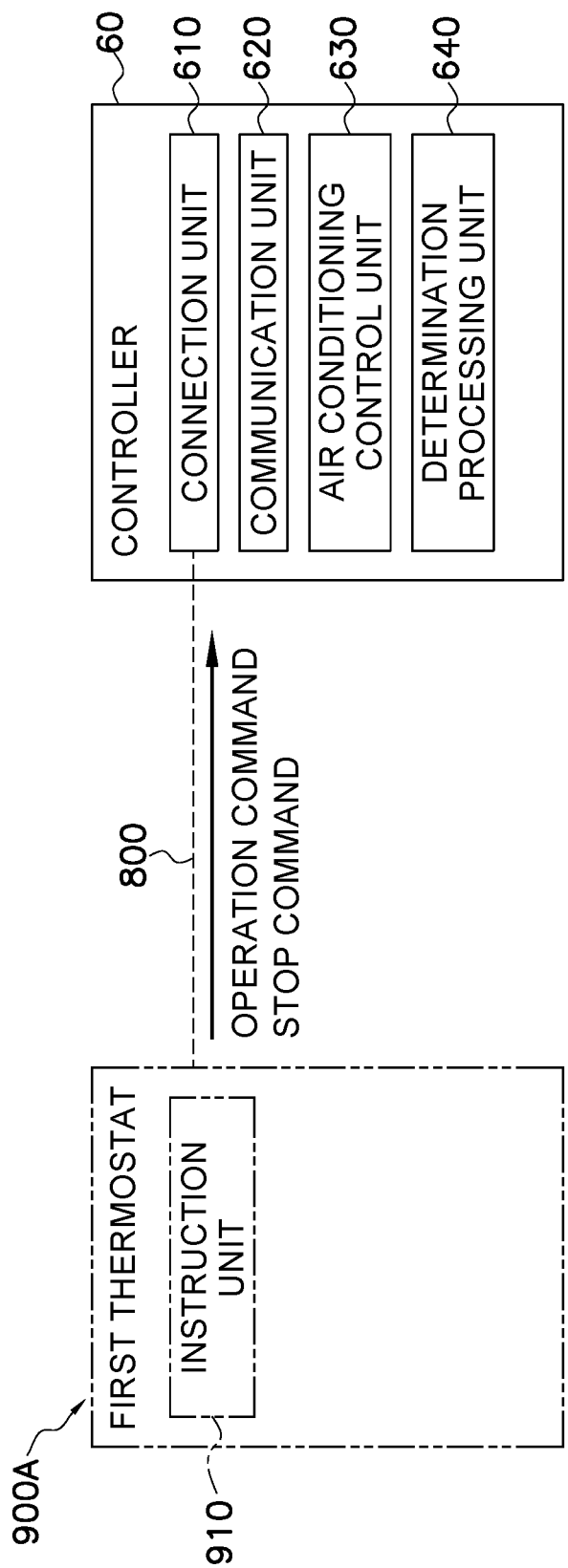
FIG. 5 is a block diagram of a controller of the air conditioning system in FIG. 1 and the first thermostat connected to the controller.
Figure 6:
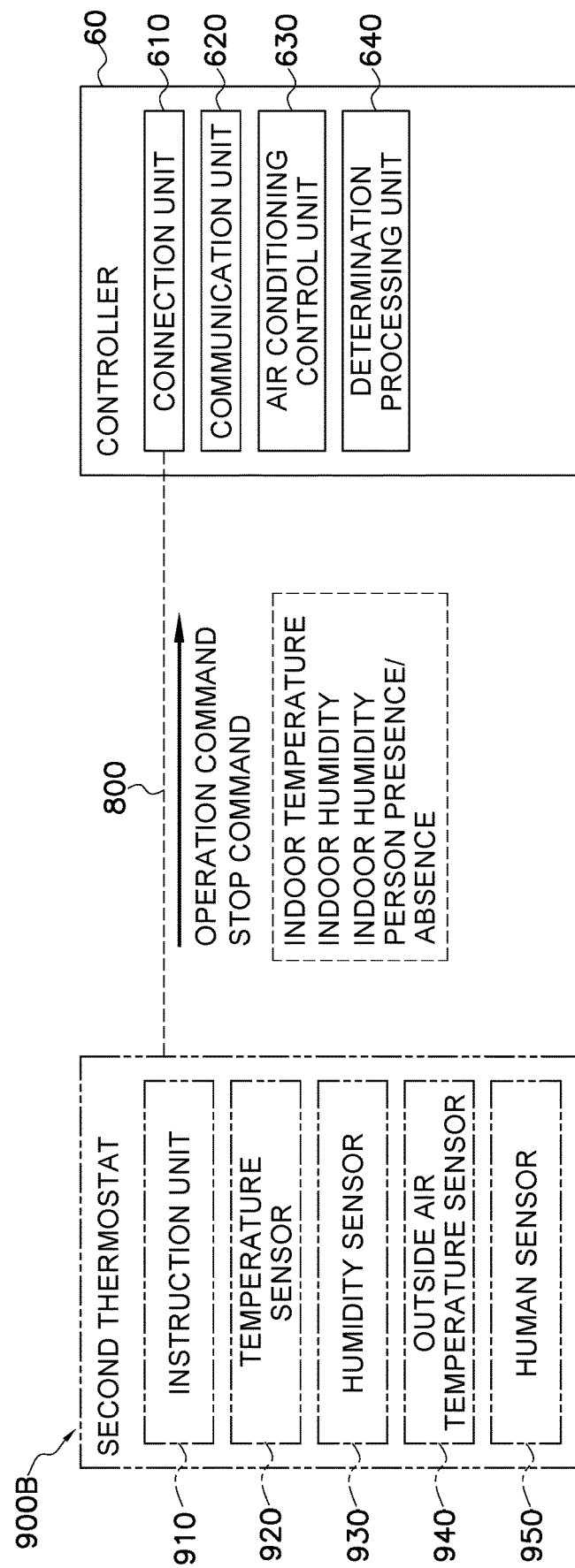
FIG. 6 is a block diagram of the controller of the air conditioning system in FIG. 1 and the second thermostat connected to the controller.
Figure 7:
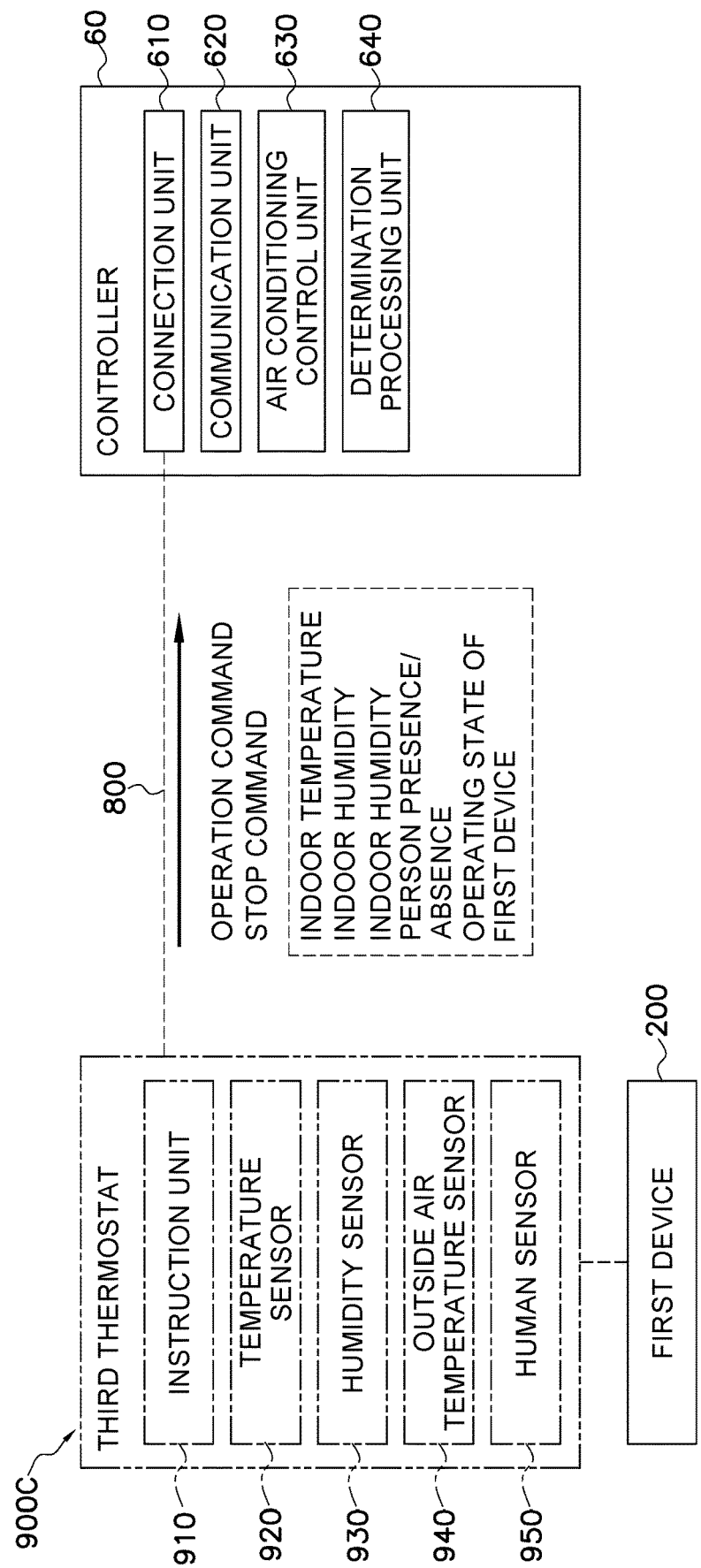
FIG. 7 is a block diagram of the controller of the air conditioning system in FIG. 1 and the third thermostat connected to the controller.

An air conditioning system 300 according to the present disclosure will be described with reference to FIG. 1 to FIG. 7. FIG. 1 is a block diagram of the air conditioning system 300 and a first thermostat 900A connected to the air conditioning system 300. FIG. 2 is a block diagram of the air conditioning system 300 and a second thermostat 900B connected to the air conditioning system 300. FIG. 3 is a block diagram of the air conditioning system 300 and a third thermostat 900C connected to the air conditioning system 300. FIG. 4 is a schematic configuration diagram of an air conditioning apparatus 100 included in the air conditioning system 300. FIG. 5 is a block diagram of a controller 60 of the air conditioning system 300 and the first thermostat 900A connected to the controller 60. FIG. 6 is a block diagram of the controller 60 and the second thermostat 900B connected to the controller 60. FIG. 7 is a block diagram of the controller 60 and the third thermostat 900C connected to the controller 60.

The air conditioning systems 300 in FIG. 1 to FIG. 3 are the same, except that the types of thermostats connected to the air conditioning systems 300 are different. The controllers 60 of the air conditioning systems 300 in FIG. 4 to FIG. 6 are also the same, except that the types of thermostats connected to the controllers 60 are different.

The air conditioning system 300 is a system for performing air conditioning of an air-conditioning target space R using the air conditioning apparatus 100, which is of the vapor compression type. The air conditioning apparatus 100 illustrated in FIG. 4 is an example of a refrigeration cycle apparatus. The air conditioning apparatus 100 is an air conditioning apparatus that performs cooling and heating of the air-conditioning target space R. However, the air conditioning apparatus 100 may not be an air conditioning apparatus capable of cooling and heating. For example, the air conditioning apparatus 100 may be an air conditioning apparatus dedicated to cooling. In this embodiment, the air conditioning system 300 includes one air conditioning apparatus 100. However, the number of air conditioning apparatuses included in the air conditioning system 300 is not limited to one, and the air conditioning system 300 may include a plurality of air conditioning apparatuses.

A thermostat is connected to the air conditioning system 300 via a communication line 800 (see FIGS. 1 to 3 and FIGS. 5 to 7). The thermostat is a device that transmits a command to the air conditioning system 300 or an air conditioning device not belonging to the air conditioning system 300 to operate/stop the air conditioning system 300 or the air conditioning device to adjust the temperature of the air-conditioning target space R to a set temperature. The air conditioning apparatus 100 of the air conditioning system 300 basically performs a cooling operation or a heating operation in accordance with a command from the thermostat. There are various types of thermostats to be connected to the air conditioning system 300. Herein, the recitation "a certain thermostat and another thermostat are different in type" means that signals (information or commands) transmitted from the thermostats to the air conditioning system 300 are different, at least in part, from each other. The air conditioning system 300 is configured to be connectable to a plurality of types of thermostats so that the air conditioning system 300 can be used in combination with a plurality of types of thermistors.

The air conditioning system 300 has a function of determining the performance of the air conditioning apparatus 100. In this embodiment, the controller 60 having a function of controlling the operation of the air conditioning apparatus 100 also has a function of determining the performance of the air conditioning apparatus 100 (see FIGS. 5 to 7). For example, the air conditioning system 300 performs initial determination of the performance of the air conditioning apparatus 100 at the time of installation of the air conditioning apparatus 100. The initial determination of the performance of the air conditioning apparatus 100 is performed in order to determine, for example, whether the air conditioning apparatus 100 exerts the normal performance. The initial determination of the performance of the air conditioning apparatus 100 is also performed in order for, for example, the air conditioning apparatus 100 to grasp the initial performance. Further, after the installation of the air conditioning apparatus 100, the air conditioning system 300 determines whether the performance of the air conditioning apparatus 100 has not deteriorated.

Note that the air conditioning system 300 performs a different performance determination process in accordance with the type of thermostat connected thereto. Further, the air conditioning system 300 changes the method for using information received from a thermostat connected to the air conditioning system 300 according to whether being in a determination processing time over which the performance determination process is performed or in a non-determination processing time over which the performance determination process is not performed. The details will be described below.

<Detailed Configuration>

(2) Thermostat

A thermostat to be connected to the air conditioning system 300 will be described in detail.

The thermostat is a device that transmits a command to the air conditioning system 300 and operates or stops the air conditioning apparatus 100 to adjust the temperature of the air-conditioning target space R to a set temperature.

In the example illustrated in FIG. 3, the thermostat (the third thermostat 900C) operates or stops a first device 200 different from the air conditioning apparatus 100 and configured to perform air conditioning of the air-conditioning target space R to adjust the temperature of the air-conditioning target space R to a set temperature. The first device 200 is, for example, a heating device that uses a boiler, or a heating device that uses an electric heater. For example, the first device 200 may be a gas furnace as disclosed in Japanese Unexamined Patent Application Publication No. 2015-218940. Alternatively, for example, the first device 200 may be a refrigeration cycle apparatus different from the air conditioning apparatus 100.

The functions of the thermostat described below may be implemented by hardware such as an electric circuit (not illustrated). Alternatively, the functions of the thermostat may be implemented in terms of software by a CPU of a microcomputer (not illustrated) executing a program. Alternatively, the functions of the thermostat may be implemented by a combination of hardware and software.

The thermostat is, for example, a device installed in the air-conditioning target space R. At least some of the functions of the thermostat given below may be provided by a computer or the like installed in a location different from the air-conditioning target space R.

As illustrated in FIGS. 1 to 3, one thermostat 900A, 900B, or 900C is connected to the air conditioning system 300. The thermostats 900A, 900B, and 900C are different types of thermostats. In other words, the plurality of types of thermostats 900A, 900B, and 900C are connectable to the air conditioning system 300. Herein, the recitation "a certain thermostat and another thermostat are different in type" means that, as described above, signals (information or commands) transmitted to the air conditioning system 300 are different, at least in part, from each other.

For example, thermostats to be connected to the air conditioning system 300 include a thermostat of a type that transmits only an operation command and a stop command to the air conditioning system 300. The operation command is a command for instructing the air conditioning system 300 to operate the air conditioning apparatus 100. Specifically, the operation command is a command for providing an instruction to perform a refrigeration cycle operation of the air conditioning apparatus 100. The refrigeration cycle operation of the air conditioning apparatus 100 is an operation of the air conditioning apparatus 100 for operating a compressor 21 to circulate refrigerant in a refrigerant circuit 10. The stop command is a command for instructing the air conditioning system 300 to stop the operation of the air conditioning apparatus 100. Specifically, the stop command is a command for providing an instruction to stop the refrigeration cycle operation of the air conditioning apparatus 100. The stop command is an example of a refrigeration cycle stop command.

The thermostats to be connected to the air conditioning system 300 further include a thermostat that transmits, in addition to an operation command and a stop command, one or more of the following exemplified pieces of information (a) to (e) to the air conditioning system 300.

(a) Temperature Information of the Air-Conditioning Target Space R

The temperature information of the air-conditioning target space R is information that the air conditioning system 300 that has received the information (signal) can recognize the temperature of the air-conditioning target space R. The temperature information of the air-conditioning target space R is hereinafter sometimes referred to as indoor temperature information.

(b) Humidity Information of the Air-Conditioning Target Space R

The humidity information of the air-conditioning target space R is information that the air conditioning system 300 that has received the information (signal) can recognize the humidity of the air-conditioning target space R. The humidity information of the air-conditioning target space R is hereinafter sometimes referred to as indoor humidity information.

(c) Temperature Information of the Heat-Source Air of the Air Conditioning Apparatus 100

The temperature information of the heat-source air of the air conditioning apparatus 100 is information that the air conditioning system 300 that has received the information (signal) can recognize the temperature of the heat-source air to be heat-exchanged with the refrigerant flowing through a heat-source-side heat exchanger 23 of a heat source unit 20 of the air conditioning apparatus 100. In this embodiment, the temperature information of the heat-source air of the air conditioning apparatus 100 is information that the temperature of air in an outside where the heat source unit 20 is installed is recognizable. The temperature information of the heat-source air of the air conditioning apparatus 100 is hereinafter sometimes referred to as outside air temperature information.

(d) Information Related to the Presence of a Person in the Air-Conditioning Target Space R The information related to the presence of a person in the air-conditioning target space R is information that the air conditioning system 300 that has received the information (signal) can recognize whether a person is in the air-conditioning target space R or not. The information related to the presence of a person in the air-conditioning target space R is hereinafter sometimes referred to as presence information.

(e) Information Related to the Operating State of an Air Conditioning Device Different from the Air Conditioning Apparatus 100

The information related to the operating state of an air conditioning device different from the air conditioning apparatus 100 is information that the air conditioning system 300 that has received the information (signal) can recognize the operating state of an air conditioning device (referred to as a different device) different from the air conditioning apparatus 100 and configured to perform air conditioning of the same air-conditioning target space R as that of the air conditioning apparatus 100. For example, the information related to the operating state of an air conditioning device different from the air conditioning apparatus 100 is information that the air conditioning system 300 that has received the information can recognize whether a different device is in operation or not. The information related to the operating state of an air conditioning device different from the air conditioning apparatus 100 is hereinafter sometimes referred to as different-device operation information.

Here, a description will be given of, as an example, a case where a thermostat connected to the air conditioning system 300 is any of the following three types, namely, the first thermostat 900A, the second thermostat 900B, and the third thermostat 900C. The types of thermostats connectable to the air conditioning system 300 are not limited to the exemplified three types. The thermostats connectable to the air conditioning system 300 may include thermostats of types other than the thermostats 900A, 900B, and 900C, instead of some or all of the thermostats 900A, 900B, and 900C or in addition to the thermostats 900A, 900B, and 900C. The thermostats connectable to the air conditioning system 300 may be any two types of thermostats among the thermostats 900A, 900B, and 900C.

(2-1) First Thermostat

The first thermostat 900A mainly includes, as a functional unit, an instruction unit 910.

The instruction unit 910 transmits an operation command to the air conditioning system 300 connected to the first thermostat 900A when the difference between a set temperature that is set in the thermostat and the temperature (indoor temperature) of the air-conditioning target space R is greater than or equal to a predetermined temperature. When the indoor temperature is substantially equal to the set temperature, the instruction unit 910 transmits a stop command to the air conditioning system 300 connected to the first thermostat 900A. The transmission of a stop command described here includes stopping the transmission of a signal of an operation command to provide an instruction to stop the air conditioning apparatus 100 of the air conditioning system 300 connected to the first thermostat 900A. In other words, the transmission of the command described here is not limited to an active transmission of a signal and includes stopping the transmission of a transmitted signal to provide a command.

The instruction unit 910 may be a mechanical signal generation unit whose contact is opened or closed by using bimetal deformation. Alternatively, the instruction unit 910 may be an electronic signal generation unit that generates a command signal on the basis of the set temperature and the indoor temperature measured using a thermistor.

(2-2) Second Thermostat

The second thermostat 900B includes an instruction unit 910, which is functionally the same as the instruction unit 910 of the first thermostat 900A. The recitation "the instruction units 910 of the first thermostat 900A and the second thermostat 900B are functionally the same" means that the functions to be achieved are substantially the same, and may have different mechanisms for generating a signal.

The second thermostat 900B includes a temperature sensor 920, a humidity sensor 930, an outside air temperature sensor 940, and a human sensor 950.

The temperature sensor 920 is a sensor that measures the temperature of the air-conditioning target space R (hereinafter referred to as indoor temperature). The second thermostat 900B transmits the indoor temperature measured by the temperature sensor 920 to the air conditioning system 300 connected thereto as indoor temperature information. The second thermostat 900B may further transmit information on the set temperature of the air-conditioning target space R to the air conditioning system 300 connected thereto.

The humidity sensor 930 is a sensor that measures the humidity of the air-conditioning target space R (hereinafter referred to as indoor humidity). The second thermostat 900B transmits the indoor humidity measured by the humidity sensor 930 to the air conditioning system 300 connected thereto as indoor humidity information.

The outside air temperature sensor 940 is a sensor that measures the temperature (hereinafter referred to as outside air temperature) of an outside where the heat source unit 20 of the air conditioning apparatus 100 is installed. In other words, the outside air temperature sensor 940 is a sensor that measures the temperature of the heat-source air of the air conditioning apparatus 100. The second thermostat 900B transmits the outside air temperature measured by the outside air temperature sensor 940 to the air conditioning system 300 connected thereto as outside air temperature information. The second thermostat 900B may not include the outside air temperature sensor 940 and may acquire the outside air temperature from a weather information server via a network such as the Internet. Then, the second thermostat 900B may transmit the outside air temperature acquired from the weather information server to the air conditioning system 300 connected thereto as outside air temperature information.

The human sensor 950 is a sensor that senses the presence of a person in the air-conditioning target space R. The second thermostat 900B transmits a sensed result of the human sensor 950 to the air conditioning system 300 connected thereto as presence information.

(2-3) Third Thermostat

The third thermostat 900C has a configuration and a function similar to the configuration and the function of the second thermostat 900B described above.

The third thermostat 900C further transmits an operation command and a stop command to the first device 200, which is different from the air conditioning apparatus 100 and configured to perform air conditioning of the air-conditioning target space R.

The third thermostat 900C also transmits to the air conditioning system 300 the same signals as those of an operation command and stop command for the first device 200. In other words, the third thermostat 900C transmits information related to the operating state of the first device 200 to the air conditioning system 300 connected thereto via the communication line 800 as different-device operation information. The signal (different-device operation information) to be transmitted from the third thermostat 900C to the air conditioning system 300 is a signal that enables the air conditioning system 300 to grasp the operating state of the first device 200, and may be a signal different from an operation command and a stop command for the first device 200.

(3) Air Conditioning Apparatus

The detailed configuration of the air conditioning apparatus 100 will be described.

The air conditioning apparatus 100 mainly includes one heat source unit 20, one use unit 50, a liquid-refrigerant connection pipe 2, a gas-refrigerant connection pipe 4, and the controller 60 (see FIG. 4). The liquid-refrigerant connection pipe 2 and the gas-refrigerant connection pipe 4 are pipes connecting the heat source unit 20 and the use unit 50 (see FIG. 4). The controller 60 controls the operation of various devices or various components of the heat source unit 20 and the use unit 50. Further, the controller 60 has a function of determining the performance of the air conditioning apparatus 100.

While the air conditioning apparatus 100 according to this embodiment includes one use unit 50, the number of use units 50 is not limited to one. The air conditioning apparatus 100 may include two or more use units 50. Also, while the air conditioning apparatus 100 according to this embodiment includes one heat source unit 20, the number of heat source units 20 is not limited to one. The air conditioning apparatus 100 may include two or more heat source units 20. Further, the air conditioning apparatus 100 may be an integral apparatus in which the heat source unit 20 and the use unit 50 are incorporated into a single unit.

The heat source unit 20 and the use unit 50 are connected via the liquid-refrigerant connection pipe 2 and the gas-refrigerant connection pipe 4 to form the refrigerant circuit 10 (see FIG. 4). The refrigerant circuit 10 is filled with refrigerant. The refrigerant with which the refrigerant circuit 10 is filled is, for example, but not limited to, fluorocarbon-based refrigerant such as R32. The refrigerant circuit 10 includes the compressor 21, a flow direction switching mechanism 22, the heat-source-side heat exchanger 23, an expansion mechanism 25 of the heat source unit 20, and a use-side heat exchanger 52 of the use unit 50 (see FIG. 4).

The air conditioning apparatus 100 has normal operating modes, namely, a cooling operating mode for executing a cooling operation and a heating operating mode for executing a heating operation. The cooling operation is an operation in which the heat-source-side heat exchanger 23 is caused to function as a condenser and the use-side heat exchanger 52 is caused to function as an evaporator to cool the air in the air-conditioning target space R where the use unit 50 is installed. The heating operation is an operation in which the heat-source-side heat exchanger 23 is caused to function as an evaporator and the use-side heat exchanger 52 is caused to function as a condenser to heat the air in the air-conditioning target space R where the use unit 50 is installed. During the heating operation, the air conditioning apparatus 100 interrupts the heating operation and performs a defrosting operation. The defrosting operation is an operation in which the heat-source-side heat exchanger 23 is caused to function as a condenser and the use-side heat exchanger 52 is caused to function as an evaporator to remove frost adhering to the heat-source-side heat exchanger 23.

Further, when the controller 60 determines the performance of the air conditioning apparatus 100, the air conditioning apparatus 100 performs a determination-process operation for the performance of the air conditioning apparatus 100. In other words, the air conditioning apparatus 100 has a determination-process operating mode, other than the normal operating mode, as an operating mode. The specific content of the determination-process operation will be described below.

(3-1) Use Unit

The use unit 50 is a unit installed in the air-conditioning target space R. For example, the use unit 50 is a ceiling-embedded unit. However, the use unit 50 of the air conditioning apparatus 100 is not limited to the ceiling-embedded type, and may be of a ceiling-hanging type, a wall-hanging type, or a floor-standing type.

The use unit 50 may be installed in a place other than the air-conditioning target space R. For example, the use unit 50 may be installed in an attic, a machine chamber, a garage, or the like. In this case, an air passage is installed for supplying the air heat-exchanged with the refrigerant in the use-side heat exchanger 52 from the use unit 50 to the air-conditioning target space R. The air passage is, for example, a duct. However, the type of the air passage is not limited to the duct and is selected as appropriate.

As described above, the use unit 50 is connected to the heat source unit 20 via the liquid-refrigerant connection pipe 2 and the gas-refrigerant connection pipe 4 to form a portion of the refrigerant circuit 10.

The use unit 50 includes a use-side refrigerant circuit 10a that constitutes a portion of the refrigerant circuit 10 (see FIG. 4). The use-side refrigerant circuit 10a mainly includes the use-side heat exchanger 52 (see FIG. 4). The use unit 50 includes a use-side fan 53, which is driven by a fan motor 53a (see FIG. 4). The use unit 50 includes various sensors. In this embodiment, the various sensors included in the use unit 50 include a liquid-side temperature sensor 54 and a gas-side temperature sensor 55 (see FIG. 4). The use unit 50 includes a use-side control unit 64 that controls the operation of the use unit 50 (see FIG. 4).

(3-1-1) Use-Side Heat Exchanger In the use-side heat exchanger 52, heat exchange is performed between the refrigerant flowing through the use-side heat exchanger 52 and the air in the air-conditioning target space R. The use-side heat exchanger 52 is not limited in type, but is, for example, a fin-and-tube heat exchanger having a plurality of heat transfer tubes and fins (not illustrated).

An end of the use-side heat exchanger 52 is connected to the liquid-refrigerant connection pipe 2 via a refrigerant pipe. The other end of the use-side heat exchanger 52 is connected to the gas-refrigerant connection pipe 4 via a refrigerant pipe. During the cooling operation and during the defrosting operation, the refrigerant flows into the use-side heat exchanger 52 from the liquid-refrigerant connection pipe 2 side, and the use-side heat exchanger 52 functions as an evaporator. During the heating operation, the refrigerant flows into the use-side heat exchanger 52 from the gas-refrigerant connection pipe 4 side, and the use-side heat exchanger 52 functions as a condenser.

(3-1-2) Use-Side Fan

The use-side fan 53 is a mechanism that sucks the air in the air-conditioning target space R into a casing (not illustrated) of the use unit 50, supplies the air to the use-side heat exchanger 52, and blows out the air heat-exchanged with the refrigerant in the use-side heat exchanger 52 to the air-conditioning target space R. The use-side fan 53 is, for example, a turbo fan. However, the type of the use-side fan 53 is not limited to the turbo fan and is selected as appropriate. The use-side fan 53 is driven by the fan motor 53a. The use-side fan 53 is a variable-air-volume fan driven by the fan motor 53a whose number of revolutions can be changed.

(3-1-3) Sensors

The use unit 50 includes sensors, namely, the liquid-side temperature sensor 54 and the gas-side temperature sensor 55 (see FIG. 2). The types of the temperature sensors and the humidity sensors are selected as appropriate.

The use unit 50 may include a sensor other than the liquid-side temperature sensor 54 and the gas-side temperature sensor 55.

The liquid-side temperature sensor 54 is disposed in the refrigerant pipe connecting the liquid side of the use-side heat exchanger 52 and the liquid-refrigerant connection pipe 2. The liquid-side temperature sensor 54 measures the temperature of the refrigerant flowing through the refrigerant pipe on the liquid side of the use-side heat exchanger 52.

The gas-side temperature sensor 55 is disposed in the refrigerant pipe connecting the gas side of the use-side heat exchanger 52 and the gas-refrigerant connection pipe 4. The gas-side temperature sensor 55 measures the temperature of the refrigerant flowing through the refrigerant pipe on the gas side of the use-side heat exchanger 52.

(3-1-4) Use-Side Control Unit

The use-side control unit 64 controls the operation of the components constituting the use unit 50.

The use-side control unit 64 includes a microcomputer disposed to control the use unit 50, a memory storing a control program implementable by the microcomputer, and so on. The configuration of the use-side control unit 64 described here is merely an example, and the functions of the use-side control unit 64 described below may be implemented by software, hardware, or a combination of software and hardware, unless any contradiction occurs.

The use-side control unit 64 is electrically connected to the use-side fan 53, the liquid-side temperature sensor 54, and the gas-side temperature sensor 55 so as to be capable of exchanging control signals and information (see FIG. 4).

The use-side control unit 64 is connected to a heat-source-side control unit 62 of the heat source unit 20 via a transmission line 66 in such a manner that control signals and the like can be exchanged. The use-side control unit 64 and the heat-source-side control unit 62 may not be connected by the physical transmission line 66, and may be communicably connected wirelessly. The use-side control unit 64 and the heat-source-side control unit 62 cooperate with each other to function as the controller 60 that controls the overall operation of the air conditioning apparatus 100. The controller 60 will be described below.

(3-2) Heat Source Unit

The heat source unit 20 is arranged outside the air-conditioning target space R. For example, the heat source unit 20 is installed on the rooftop of a building in which the air conditioning apparatus 100 is installed, or adjacent to the building.

The heat source unit 20 is connected to the use unit 50 via the liquid-refrigerant connection pipe 2 and the gas-refrigerant connection pipe 4. The heat source unit 20 constitutes the refrigerant circuit 10 together with the use unit 50 (see FIG. 4).

The heat source unit 20 includes a heat-source-side refrigerant circuit 10b that constitutes a portion of the refrigerant circuit 10 (see FIG. 4). The heat-source-side refrigerant circuit 10b mainly includes the compressor 21, the flow direction switching mechanism 22, the heat-source-side heat exchanger 23, the expansion mechanism 25, an accumulator 24, a liquid-side shutoff valve 14, and a gas-side shutoff valve 16 (see FIG. 4). The heat source unit 20 includes a heat-source-side fan 28, which is driven by a fan motor 28a (see FIG. 4). The heat source unit 20 includes various sensors. The sensors included in the heat source unit 20 will be described below. The heat source unit 20 includes the heat-source-side control unit 62 (see FIG. 4).

However, the heat source unit 20 does not need to include all of the constituent elements described above, and the constituent elements of the heat source unit 20 are selected as appropriate. For example, the heat source unit 20 may not include the expansion mechanism 25 as a configuration, and a similar expansion mechanism may be included in the use unit 50 instead of the heat source unit 20.

Further, the heat source unit 20 includes a suction pipe 12a, a discharge pipe 12b, a first gas refrigerant pipe 12c, a liquid refrigerant pipe 12d, and a second gas refrigerant pipe 12e (see FIG. 4). The suction pipe 12a connects the flow direction switching mechanism 22 and the suction side of the compressor 21 (see FIG. 4). The suction pipe 12a is provided with the accumulator 24 (see FIG. 4). The discharge pipe 12b connects the discharge side of the compressor 21 and the flow direction switching mechanism 22 (see FIG. 4). The first gas refrigerant pipe 12c connects the flow direction switching mechanism 22 and the gas side of the heat-source-side heat exchanger 23 (see FIG. 4). The liquid refrigerant pipe 12d connects the liquid side of the heat-source-side heat exchanger 23 and the liquid-refrigerant connection pipe 2 (see FIG. 4). The liquid refrigerant pipe 12d is provided with the expansion mechanism 25 (see FIG. 4). The liquid-side shutoff valve 14 is disposed at a connection portion between the liquid refrigerant pipe 12d and the liquid-refrigerant connection pipe 2 (see FIG. 4). The second gas refrigerant pipe 12e connects the flow direction switching mechanism 22 and the gas-refrigerant connection pipe 4 (see FIG. 4). The gas-side shutoff valve 16 is disposed at a connection portion between the second gas refrigerant pipe 12e and the gas-refrigerant connection pipe 4 (see FIG. 4).

(3-2-1) Compressor

The compressor 21 is a device that sucks low-pressure refrigerant in a refrigeration cycle from the suction pipe 12a, compresses the refrigerant using a compression mechanism (not illustrated), and discharges the compressed refrigerant to the discharge pipe 12b. In this embodiment, the heat source unit 20 includes only one compressor 21. However, the number of compressors 21 is not limited to one. For example, the heat source unit 20 may include a plurality of compressors 21.

The compressor 21 is not limited in type, but is, for example, a positive-displacement compressor such as a rotary or scroll positive-displacement compressor. The compression mechanism (not illustrated) of the compressor 21 is driven by a motor 21a (see FIG. 4). When the motor 21a drives the compression mechanism (not illustrated), the refrigerant is compressed by the compression mechanism.

The motor 21a is, for example, a constant-speed motor. However, this is not limiting, and the motor 21a may be a motor whose number of revolutions can be controlled by an inverter.

(3-2-2) Flow Direction Switching Mechanism

The flow direction switching mechanism 22 is a mechanism that switches the flow direction of the refrigerant to change the state of the heat-source-side heat exchanger 23 between a first state in which the heat-source-side heat exchanger 23 functions as a condenser and a second state in which the heat-source-side heat exchanger 23 functions as an evaporator. When the flow direction switching mechanism 22 sets the state of the heat-source-side heat exchanger 23 to the first state, the use-side heat exchanger 52 functions as an evaporator. On the other hand, when the flow direction switching mechanism 22 sets the state of the heat-source-side heat exchanger 23 to the second state, the use-side heat exchanger 52 functions as a condenser.

In this embodiment, the flow direction switching mechanism 22 is a four-way switching valve. However, the flow direction switching mechanism 22 is not limited to a four-way switching valve. For example, the flow direction switching mechanism 22 may be configured by a combination of a plurality of electromagnetic valves and refrigerant pipes so that the direction of flow of the refrigerant described below can be realized.

During the cooling operation and during the defrosting operation, the flow direction switching mechanism 22 sets the state of the heat-source-side heat exchanger 23 to the first state. In other words, during the cooling operation and during the defrosting operation, the flow direction switching mechanism 22 causes the suction pipe 12a to communicate with the second gas refrigerant pipe 12e and causes the discharge pipe 12b to communicate with the first gas refrigerant pipe 12c (see the solid line in the flow direction switching mechanism 22 in FIG. 4). During the cooling operation and during the defrosting operation, the refrigerant discharged from the compressor 21 flows through the heat-source-side heat exchanger 23, the expansion mechanism 25, and the use-side heat exchanger 52 in the refrigerant circuit 10 in this order, and returns to the compressor 21.

During the heating operation, the flow direction switching mechanism 22 sets the state of the heat-source-side heat exchanger 23 to the second state. In other words, during the heating operation, the flow direction switching mechanism 22 causes the suction pipe 12a to communicate with the first gas refrigerant pipe 12c and causes the discharge pipe 12b to communicate with the second gas refrigerant pipe 12e (see the broken line in the flow direction switching mechanism 22 in FIG. 4). During the heating operation, the refrigerant discharged from the compressor 21 flows through the use-side heat exchanger 52, the expansion mechanism 25, and the heat-source-side heat exchanger 23 in the refrigerant circuit 10 in this order, and returns to the compressor 21.

(3-2-3) Heat-Source-Side Heat Exchanger

In the heat-source-side heat exchanger 23, heat exchange is performed between the refrigerant flowing through the inside and the air (heat-source air) in the installation location of the heat source unit 20. In a case where the heat source unit 20 is installed outdoors, in the heat-source-side heat exchanger 23, heat exchange is performed between the refrigerant flowing through the inside and the air of the outside.

The heat-source-side heat exchanger 23 is not limited in type, but is, for example, a fin-and-tube heat exchanger having a plurality of heat transfer tubes and fins (not illustrated).

An end of the heat-source-side heat exchanger 23 is connected to the liquid refrigerant pipe 12d. The other end of the heat-source-side heat exchanger 23 is connected to the first gas refrigerant pipe 12c.

The heat-source-side heat exchanger 23 functions as a condenser (radiator) during the cooling operation and during the defrosting operation, and functions as an evaporator during the heating operation.

(3-2-4) Expansion Mechanism

The expansion mechanism 25 is arranged between the heat-source-side heat exchanger 23 and the use-side heat exchanger 52 in the refrigerant circuit 10 (see FIG. 4). The expansion mechanism 25 is arranged in the liquid refrigerant pipe 12d between the heat-source-side heat exchanger 23 and the liquid-side shutoff valve 14 (see FIG. 4). In a case where the heat source unit 20 does not include the expansion mechanism 25, but the use unit 50 includes an expansion mechanism similar to the expansion mechanism 25, the expansion mechanism may be disposed in the refrigerant pipe connecting the liquid-refrigerant connection pipe 2 and the use-side heat exchanger 52 inside the use unit 50.

The expansion mechanism 25 adjusts the pressure and flow rate of the refrigerant flowing through the liquid refrigerant pipe 12d. In this embodiment, the expansion mechanism 25 is an electronic expansion valve with a variable opening degree. However, the expansion mechanism 25 is not limited to an electronic expansion valve. The expansion mechanism 25 may be a temperature-sensitive cylindrical expansion valve or a capillary tube.

(3-2-5) Accumulator

The accumulator 24 has a gas-liquid separation function for separating the refrigerant flowing therein into gas refrigerant and liquid refrigerant. Further, the accumulator 24 is a container having a function of storing surplus refrigerant generated in accordance with a change in the operation load of the use unit 50 or the like. The accumulator 24 is disposed in the suction pipe 12a (see FIG. 4). The refrigerant flowing into the accumulator 24 is separated into gas refrigerant and liquid refrigerant, and the gas refrigerant, which is collected in the upper space, flows out to the compressor 21.

(3-2-6) Liquid-Side Shutoff Valve and Gas-Side Shutoff Valve

The liquid-side shutoff valve 14 is a valve disposed in the connection portion between the liquid refrigerant pipe 12d and the liquid-refrigerant connection pipe 2. The gas-side shutoff valve 16 is a valve disposed in the connection portion between the second gas refrigerant pipe 12e and the gas-refrigerant connection pipe 4. The liquid-side shutoff valve 14 and the gas-side shutoff valve 16 are, for example, manually operated valves.

(3-2-7) Heat-Source-Side Fan

The heat-source-side fan 28 is a fan for sucking the heat-source air outside the heat source unit 20 into a casing (not illustrated) of the heat source unit 20, supplying the heat-source air to the heat-source-side heat exchanger 23, and discharging the air heat-exchanged with the refrigerant in the heat-source-side heat exchanger 23 to the outside of the casing of the heat source unit 20.

The heat-source-side fan 28 is, for example, a propeller fan. However, the fan type of the heat-source-side fan 28 is not limited to the propeller fan and is selected as appropriate.

The heat-source-side fan 28 is driven by the fan motor 28a (see FIG. 4). The heat-source-side fan 28 is a variable-air-volume fan driven by the fan motor 28a whose number of revolutions can be changed.

(3-2-8) Sensors

The heat source unit 20 is provided with various sensors. For example, the heat source unit 20 includes the following temperature sensors and pressure sensors. The types of the temperature sensors and the pressure sensors are selected as appropriate.

The sensors included in the heat source unit 20 include a discharge pressure sensor 30, a suction pressure sensor 31, a suction temperature sensor 32, a discharge temperature sensor 33, a heat-exchange temperature sensor 34, and a liquid-side temperature sensor 35 (see FIG. 4). The heat source unit 20 may include only some of the sensors 30 to 35 described above. Alternatively, the heat source unit 20 may include a sensor other than the sensors 30 to 35 described above.

The discharge pressure sensor 30 is disposed in the discharge pipe 12b (see FIG. 4). The discharge pressure sensor 30 is a sensor that measures a discharge pressure Pd.

The suction pressure sensor 31 is disposed in the suction pipe 12a (see FIG. 4). The suction pressure sensor 31 is a sensor that measures a suction pressure Ps.

The suction temperature sensor 32 is disposed in the suction pipe 12a (see FIG. 4). The suction temperature sensor 32 is a sensor that measures a suction temperature Ts.

The discharge temperature sensor 33 is disposed in the discharge pipe 12b (see FIG. 4). The discharge temperature sensor 33 is a sensor that measures a discharge temperature Td.

The heat-exchange temperature sensor 34 is disposed in the heat-source-side heat exchanger 23 (see FIG. 4). The heat-exchange temperature sensor 34 measures the temperature of the refrigerant flowing through the heat-source-side heat exchanger 23. The heat-exchange temperature sensor 34 measures the refrigerant temperature corresponding to a condensation temperature Tc during the cooling operation, and measures the refrigerant temperature corresponding to an evaporation temperature Te during the heating operation.

The liquid-side temperature sensor 35 is disposed in the liquid refrigerant pipe 12d (on the liquid side of the heat-source-side heat exchanger 23) and measures the temperature Tb of the refrigerant flowing through the liquid refrigerant pipe 12d. When the state of the heat-source-side heat exchanger 23 is switched to the first state, the temperature Tb of the refrigerant measured by the liquid-side temperature sensor 35 is subtracted from the condensation temperature Tc measured by the heat-exchange temperature sensor 34 to calculate the degree of subcooling SCr of the refrigeration cycle.

(3-2-9) Heat-Source-Side Control Unit

The heat-source-side control unit 62 controls the operation of the components constituting the heat source unit 20.

The heat-source-side control unit 62 includes a microcomputer disposed to control the heat source unit 20, a memory storing a control program implementable by the microcomputer, and so on. The configuration of the heat-source-side control unit 62 described here is merely an example, and the functions of the heat-source-side control unit 62 described below may be implemented by software, hardware, or a combination of software and hardware, unless any contradiction occurs.

The heat-source-side control unit 62 is electrically connected to the compressor 21, the flow direction switching mechanism 22, the expansion mechanism 25, the heat-source-side fan 28, the discharge pressure sensor 30, the suction pressure sensor 31, the suction temperature sensor 32, the discharge temperature sensor 33, the heat-exchange temperature sensor 34, and the liquid-side temperature sensor 35 so as to be capable of exchanging control signals and information (see FIG. 4).

The heat-source-side control unit 62 is connected to the use-side control unit 64 of the use unit 50 via the transmission line 66 in such a manner that control signals and the like can be exchanged. The heat-source-side control unit 62 and the use-side control unit 64 cooperate with each other to function as the controller 60 that controls the overall operation of the air conditioning apparatus 100. Further, the controller 60 has a function of determining the performance of the air conditioning apparatus 100. The controller 60 will be described below.

(3-3) Connection Pipes

The air conditioning apparatus 100 includes connection pipes, namely, the liquid-refrigerant connection pipe 2 and the gas-refrigerant connection pipe 4. The liquid-refrigerant connection pipe 2 and the gas-refrigerant connection pipe 4 are pipes constructed at an installation site of the air conditioning apparatus 100 at the time of installation of the air conditioning apparatus 100. The liquid-refrigerant connection pipe 2 and the gas-refrigerant connection pipe 4 are implemented using pipes having various lengths and diameters in accordance with installation conditions such as the installation location and a combination of the heat source unit 20 and the use unit 50.

The use-side refrigerant circuit 10a of the use unit 50 and the heat-source-side refrigerant circuit 10b of the heat source unit 20 are connected by the liquid-refrigerant connection pipe 2 and the gas-refrigerant connection pipe 4 to form the refrigerant circuit 10 of the air conditioning apparatus 100.

(3-4) Controller

The controller 60 is configured such that the heat-source-side control unit 62 of the heat source unit 20 and the use-side control unit 64 of the use unit 50 are communicably connected via the transmission line 66. The controller 60 controls the overall operation of the air conditioning apparatus 100 by the microcomputer of the heat-source-side control unit 62 or the use-side control unit 64 executing the program stored in the memory.

In this embodiment, the heat-source-side control unit 62 and the use-side control unit 64 constitute the controller 60. However, the configuration of the controller 60 is not limited to this form.

For example, the air conditioning apparatus 100 may include, in addition to the heat-source-side control unit 62 and the use-side control unit 64 or instead of the heat-source-side control unit 62 and the use-side control unit 64, a control device that implements some or all of the functions of the controller 60 described below. The control device may be a server installed in a location different from the location in which the air conditioning system 300 is installed.

As illustrated in FIG. 4, the controller 60 is electrically connected to various devices of the heat source unit 20 and the use unit 50, including the compressor 21, the flow direction switching mechanism 22, the expansion mechanism 25, the heat-source-side fan 28, and the use-side fan 53. As illustrated in FIG. 4, the controller 60 is further electrically connected to the various sensors 30 to 35 disposed in the heat source unit 20 and the various sensors 54 and 55 disposed in the use unit 50.

As illustrated in FIG. 5 to FIG. 7, the controller 60 includes a connection unit 610 to which the first thermostat 900A, the second thermostat 900B, or the third thermostat 900C is connected via the communication line 800. In other words, the plurality of types of thermostats 900A, 900B, and 900C are connectable to the connection unit 610 via the communication line 800. The communication line 800 is not limited to a physical signal line and may be wireless. Herein, a thermostat is connected to the connection unit 610, which means that the thermostat can be connected to the connection unit 610 in such a manner that a signal (command or information) transmitted from the thermostat via the connection unit 610 is receivable by the controller 60.

The connection unit 610 is a hardware interface and/or a software interface through which the controller 60 can receive a signal from the thermostat 900A, 900B, or 900C. In some cases, the air conditioning system 300 is connected to a thermostat via a signal line and receives a contact signal from the thermostat. In other cases, the air conditioning system 300 is connected to a thermostat via Ethernet (registered trademark) or a wireless LAN.

Further, the controller 60 includes a communication unit 620 that performs communication with the thermostat 900A, 900B, or 900C connected to the connection unit 610. The controller 60 receives a signal from the thermostat 900A, 900B, or 900C connected to the connection unit 610 via the communication unit 620. In other words, the controller 60 receives information transmitted as a signal from the thermostat 900A, 900B, or 900C connected to the connection unit 610 via the communication unit 620. The information described here includes a command provided from the thermostat 900A, 900B, or 900C to the air conditioning system 300. The command provided from the thermostat 900A, 900B, or 900C to the air conditioning system 300 includes an operation command and a stop command for the air conditioning apparatus 100.

The controller 60 further includes, as functional units, an air conditioning control unit 630 and a determination processing unit 640.

The air conditioning control unit 630 controls the operation and stop of the air conditioning apparatus 100 and the operation of the various devices 21, 22, 25, 28, 53, and so on of the air conditioning apparatus 100 on the basis of measurement signals of the various sensors 30 to 35, 54, and 55 or information received from the thermostat 900A, 900B, or 900C. The control of the operation of the air conditioning apparatus 100 during the cooling operation and during the heating operation will be described below.

The determination processing unit 640 performs a performance determination process for the air conditioning apparatus 100.

For example, the determination processing unit 640 instructs the air conditioning control unit 630 at a predetermined timing that the air conditioning apparatus 100 perform a predetermined determination-process operation. Then, the determination processing unit 640 acquires a measurement value of a predetermined sensor as a determination index value and compares the determination index value with a reference to perform performance determination. The content of the performance determination process for the air conditioning apparatus 100 by the determination processing unit 640 will be described below. The content of the determination-process operation will also be described below together with the description of the content of performance determination.

(3-5) Operation of Air Conditioning Apparatus

The control of the operation of the air conditioning apparatus 100 during the cooling operation and during the heating operation will be described.

(3-5-1) Operation during Cooling Operation

When an instruction is given to the air conditioning apparatus 100 to execute the cooling operation, the air conditioning control unit 630 of the controller 60 sets the operating mode of the air conditioning apparatus 100 to the cooling operating mode. The air conditioning control unit 630 controls the flow direction switching mechanism 22 to achieve the state indicated by the solid line in FIG. 4 so that the state of the heat-source-side heat exchanger 23 becomes the first state in which the heat-source-side heat exchanger 23 functions as a condenser, and operates the compressor 21, the heat-source-side fan 28, and the use-side fan 53.

During the cooling operation, for example, the air conditioning control unit 630 controls the devices of the air conditioning apparatus 100 in the following manner. The control of the operation of the air conditioning apparatus 100 during the cooling operation described here is an example, and the control method for the air conditioning apparatus 100 by the air conditioning control unit 630 during the cooling operation is not limited. For example, the air conditioning control unit 630 may control the operation of various devices on the basis of parameters other than those described here.

The air conditioning control unit 630 controls the number of revolutions of the fan motor 28a, which drives the heat-source-side fan 28, and the number of revolutions of the fan motor 53a, which drives the use-side fan 53, to predetermined numbers of revolutions.

The air conditioning control unit 630 adjusts the opening degree of the electronic expansion valve, which is an example of the expansion mechanism 25, so that the degree of subcooling SCr of the refrigerant at the liquid-side outlet of the heat-source-side heat exchanger 23 becomes a predetermined target degree of subcooling SCrs. The degree of subcooling SCr of the refrigerant at the liquid-side outlet of the heat-source-side heat exchanger 23 is calculated by, for example, subtracting the measurement value (the temperature Tb) of the liquid-side temperature sensor 35 from the condensation temperature Tc measured by the heat-exchange temperature sensor 34. The degree of subcooling SCr may be calculated based on the measurement value of any other sensor.

When the operating capacity of the compressor 21 is constant (not variable), the air conditioning control unit 630 controls only the operation and stop of the compressor 21. In contrast, when the operating capacity of the compressor 21 is variable, the air conditioning control unit 630 controls the number of revolutions of the motor 21a, and the air conditioning control unit 630 controls the operating capacity of the compressor 21 so that the evaporation temperature Te corresponding to the measurement value (the suction pressure Ps) of the suction pressure sensor 31 has a predetermined value. For example, when the indoor temperature and the set temperature are transmitted from the thermostat 900B or 900C as information, the air conditioning control unit 630 controls the operating capacity of the compressor 21 so that the evaporation temperature Te becomes close to a target evaporation temperature determined by the temperature difference between the indoor temperature and the set temperature.

When the operation of the devices of the air conditioning apparatus 100 is controlled in the manner described above during the cooling operation, the refrigerant flows through the refrigerant circuit 10 as follows.

When the compressor 21 is activated, the low-pressure gas refrigerant in the refrigeration cycle is sucked into the compressor 21 and compressed by the compressor 21 into high-pressure gas refrigerant in the refrigeration cycle. The high-pressure gas refrigerant is delivered to the heat-source-side heat exchanger 23 through the flow direction switching mechanism 22, exchanges heat with the heat-source air supplied by the heat-source-side fan 28, and condenses into high-pressure liquid refrigerant. The high-pressure liquid refrigerant flows through the liquid refrigerant pipe 12d. In the expansion mechanism 25, the high-pressure liquid refrigerant is decompressed to near the suction pressure of the compressor 21 and becomes refrigerant in a gas-liquid two-phase state, which is delivered to the use unit 50. In the use-side heat exchanger 52, the refrigerant in the gas-liquid two-phase state delivered to the use unit 50 exchanges heat with the air in the air-conditioning target space R, which is supplied to the use-side heat exchanger 52 by the use-side fan 53, and evaporates into low-pressure gas refrigerant. The low-pressure gas refrigerant is delivered to the heat source unit 20 through the gas-refrigerant connection pipe 4 and flows into the accumulator 24 through the flow direction switching mechanism 22. The low-pressure gas refrigerant flowing into the accumulator 24 is sucked into the compressor 21 again. On the other hand, the temperature of the air supplied to the use-side heat exchanger 52 is decreased by heat exchange with the refrigerant flowing through the use-side heat exchanger 52, and the air cooled by the use-side heat exchanger 52 is blown out into the air-conditioning target space R.

(3-5-2) Operation during Heating Operation When an instruction is given to the air conditioning apparatus 100 to execute the heating operation, the air conditioning control unit 630 of the controller 60 sets the operating mode of the air conditioning apparatus 100 to the heating operating mode. The air conditioning control unit 630 controls the flow direction switching mechanism 22 to achieve the state indicated by the broken line in FIG. 4 so that the state of the heat-source-side heat exchanger 23 becomes the second state in which the heat-source-side heat exchanger 23 functions as an evaporator, and operates the compressor 21, the heat-source-side fan 28, and the use-side fan 53.

During the heating operation, for example, the air conditioning control unit 630 controls the devices of the air conditioning apparatus 100 in the following manner. The control of the operation of the air conditioning apparatus 100 during the heating operation described here is an example, and the control method for the air conditioning apparatus 100 by the air conditioning control unit 630 during the heating operation is not limited. For example, the air conditioning control unit 630 may control the operation of various devices on the basis of parameters other than those described here.

The air conditioning control unit 630 controls the number of revolutions of the fan motor 28a, which drives the heat-source-side fan 28, and the number of revolutions of the fan motor 53a, which drives the use-side fan 53, to predetermined numbers of revolutions.

The air conditioning control unit 630 adjusts the opening degree of the electronic expansion valve, which is an example of the expansion mechanism 25, so that the degree of subcooling SCr of the refrigerant at the liquid-side outlet of the use-side heat exchanger 52 becomes a predetermined target degree of subcooling SCrs. The degree of subcooling SCr of the refrigerant at the liquid-side outlet of the use-side heat exchanger 52 is calculated by, for example, subtracting the measurement value of the liquid-side temperature sensor 54 from the condensation temperature Tc converted from the measurement value (the discharge pressure Pd) of the discharge pressure sensor 30.

When the operating capacity of the compressor 21 is constant, the air conditioning control unit 630 controls only the operation and stop of the compressor 21. In contrast, when the operating capacity of the compressor 21 is variable, the air conditioning control unit 630 controls the number of revolutions of the motor 21a, and the air conditioning control unit 630 controls the operating capacity of the compressor 21 so that the condensation temperature Tc corresponding to the measurement value (the discharge pressure Pd) of the discharge pressure sensor 30 has a predetermined value. For example, when the indoor temperature and the set temperature are transmitted from the thermostat 900B or 900C as information, the air conditioning control unit 630 controls the operating capacity of the compressor 21 so that the condensation temperature Tc becomes close to a target condensation temperature determined by the temperature difference between the indoor temperature and the set temperature.

When the operation of the devices of the air conditioning apparatus 100 is controlled in the manner described above during the heating operation, the refrigerant flows through the refrigerant circuit 10 as follows.

When the compressor 21 is activated, the low-pressure gas refrigerant in the refrigeration cycle is sucked into the compressor 21 and compressed by the compressor 21 into high-pressure gas refrigerant in the refrigeration cycle. The high-pressure gas refrigerant is delivered to the use-side heat exchanger 52 through the flow direction switching mechanism 22, exchanges heat with the air in the air-conditioning target space R, which is supplied by the use-side fan 53, and condenses into high-pressure liquid refrigerant. The temperature of the air supplied to the use-side heat exchanger 52 is increased by heat exchange with the refrigerant flowing through the use-side heat exchanger 52, and the air heated by the use-side heat exchanger 52 is blown out into the air-conditioning target space R. The high-pressure liquid refrigerant flowing out of the use-side heat exchanger 52 is delivered to the heat source unit 20 through the liquid-refrigerant connection pipe 2 and flows into the liquid refrigerant pipe 12d. The refrigerant flowing through the liquid refrigerant pipe 12d is decompressed to near the suction pressure of the compressor 21 when passing through the expansion mechanism 25, and becomes refrigerant in a gas-liquid two-phase state, which flows into the heat-source-side heat exchanger 23. The low-pressure refrigerant in the gas-liquid two-phase state flowing into the heat-source-side heat exchanger 23 exchanges heat with the heat-source air supplied by the heat-source-side fan 28, and evaporates into low-pressure gas refrigerant, which flows into the accumulator 24 through the flow direction switching mechanism 22. The low-pressure gas refrigerant flowing into the accumulator 24 is sucked into the compressor 21 again.

(3-6) Performance Determination of Air Conditioning Apparatus

Performance determination of the air conditioning apparatus 100 by the determination processing unit 640 will be described.

For example, in a case where an instruction is given from an operation device such as a remote controller (not illustrated) of the air conditioning apparatus 100 to execute performance determination of the air conditioning apparatus 100 or when a predetermined period has elapsed since the previous performance determination of the air conditioning apparatus 100, the determination processing unit 640 determines that a condition for performing a performance determination process is satisfied. When the determination processing unit 640 determines that the condition for performing a performance determination process is satisfied, the determination processing unit 640 sets a flag indicating that the condition for performing a performance determination process is satisfied. After the condition for performing a performance determination process is satisfied, at a predetermined timing, the determination processing unit 640 instructs the air conditioning control unit 630 to cause the air conditioning apparatus 100 to perform a determination-process operation. In response to receipt of an instruction from the determination processing unit 640 to perform a determination-process operation, the air conditioning control unit 630 sets the operating mode of the air conditioning apparatus 100 to the determination-process operating mode. Then, the determination processing unit 640 determines the performance of the air conditioning apparatus 100 on the basis of a predetermined determination index value obtained in the determination-process operation. When the performance determination of the air conditioning apparatus 100 is completed, the determination processing unit 640 clears the flag indicating that the condition for performing a performance determination process is satisfied.

For example, the determination processing unit 640 determines the performance of the air conditioning apparatus 100 on the basis of a determination index value obtained in the determination-process operation at the time of installation of the air conditioning apparatus 100. Also, the determination processing unit 640 determines the performance of the air conditioning apparatus 100 on the basis of a determination index value obtained in the determination-process operation performed after a predetermined period elapses from the installation of the air conditioning apparatus 100. For example, the determination processing unit 640 periodically determines a degradation of the performance of the air conditioning apparatus 100. Herein, a degradation of the performance of the air conditioning apparatus 100 refers to a reduction in performance relative to the initial performance of the air conditioning apparatus 100.

The performance determination of the air conditioning apparatus 100 by the determination processing unit 640 includes at least one of the following: performance determination regarding the amount of refrigerant in the air conditioning apparatus 100; performance determination regarding contamination of a heat exchanger or the like of the air conditioning apparatus 100; and performance determination regarding a failure of the air conditioning apparatus 100.

In the following, a description will be first given of a typical method for determining the performance of the air conditioning apparatus 100 by the determination processing unit 640 without taking into account the presence of signals of thermostats.

Then, a description will be given of an example in which how information from the thermostat 900A, 900B, or 900C is handled is changed between a determination processing time and a non-determination processing time of the air conditioning apparatus 100. Also, a description will be given of how the performance determination process for the air conditioning apparatus 100 by the determination processing unit 640 differs in accordance with the type of the thermostat 900A, 900B, or 900C connected to the air conditioning system 300.

(3-6-1) Description of Typical Method for Performance Determination of Air Conditioning Apparatus by Determination Processing Unit (a) Performance Determination regarding Amount of Refrigerant An example of the performance determination regarding the amount of refrigerant in the air conditioning apparatus 100 will be described.

First, a determination-process operation (hereinafter referred to as the first operation) performed in the performance determination regarding the amount of refrigerant in the air conditioning apparatus 100 will be described.

In the first operation, the air conditioning control unit 630 preferably controls the flow direction switching mechanism 22 so that the state of the heat-source-side heat exchanger 23 becomes the first state in which the heat-source-side heat exchanger 23 functions as a condenser. In other words, the first operation is preferably an operation in which the refrigerant flows through the refrigerant circuit 10 in a direction similar to that during the cooling operation. In the first operation, furthermore, the air conditioning control unit 630 preferably controls the air conditioning apparatus 100 as follows.

The air conditioning control unit 630 controls the number of revolutions of the fan motor 28a so that the condensation pressure of the refrigerant in the heat-source-side heat exchanger 23 has a predetermined value. The condensation pressure of the refrigerant may be sensed using the discharge pressure sensor 30 or may be calculated from the condensation temperature Tc sensed by the heat-exchange temperature sensor 34. Further, the air conditioning control unit 630 controls the expansion mechanism 25 so that the degree of superheating at the outlet of the use-side heat exchanger 52 functioning as an evaporator has a positive value (>0). The degree of superheating is calculated as, for example, the difference between the measurement value of the gas-side temperature sensor 55 and the measurement value of the liquid-side temperature sensor 54. When the operating capacity of the compressor 21 is variable, the air conditioning control unit 630 controls the number of revolutions of the motor 21a of the compressor 21 so that the evaporation pressure has a predetermined value. The evaporation pressure of the refrigerant may be sensed using the suction pressure sensor 31, or may be calculated from the evaporation temperature Te sensed by the liquid-side temperature sensor 54.

When the first operation is performed and the air conditioning apparatus 100 enters a predetermined operating state, the determination processing unit 640 acquires the degree of subcooling as a determination index value. For example, when the condensation pressure, the degree of superheating, and the evaporation pressure are substantially stabilized at target values, the determination processing unit 640 acquires the degree of subcooling as a determination index value. For example, the determination processing unit 640 acquires, from the air conditioning apparatus 100, the condensation temperature Tc measured by the heat-exchange temperature sensor 34 and the temperature Tb measured by the liquid-side temperature sensor 35. Then, the determination processing unit 640 acquires, as a determination index value, the degree of subcooling SCr obtained by subtracting the temperature Tb measured by the liquid-side temperature sensor 35 from the condensation temperature Tc measured by the heat-exchange temperature sensor 34.

Alternatively, the determination processing unit 640 may acquire, as a determination index value, the degree of subcooling SCr obtained by subtracting the temperature Tb measured by the liquid-side temperature sensor 35 from a value obtained by converting the discharge pressure Pd measured by the discharge pressure sensor 30 into the condensation temperature Tc.

Then, the determination processing unit 640 performs performance determination regarding the amount of refrigerant in the air conditioning apparatus 100 on the basis of the degree of subcooling SCr serving as an acquired determination index value. Specifically, when the degree of subcooling SCr is smaller than the reference, the determination processing unit 640 determines that the amount of refrigerant is insufficient.

At the time of the initial performance determination, in other words, at the time of determination of the initial performance, the determination processing unit 640 compares the degree of subcooling SCr with a default reference prepared in advance and performs the performance determination. At the time of the second and subsequent performance determinations, the determination processing unit 640 may compare the degree of subcooling SCr with the degree of subcooling SCr at the time of the initial performance determination, which serves as a reference, and perform the performance determination. Also at the time of the second and subsequent performance determinations, the determination processing unit 640 may compare the degree of subcooling SCr with the default reference and perform the performance determination.

In a case where the determination processing unit 640 determines that the amount of refrigerant in the air conditioning apparatus 100 is insufficient, the determination processing unit 640 preferably notifies the user of the air conditioning apparatus 100 or the installation worker, the maintenance worker, or the like of the air conditioning apparatus 100 of the insufficient amount of refrigerant. For example, the determination processing unit 640 preferably causes a display (not illustrated) to display information notifying the insufficient amount of refrigerant. Alternatively, the determination processing unit 640 may notify a mobile terminal or the like held by the installation worker, the maintenance worker, or the like of the air conditioning apparatus 100 of the insufficient amount of refrigerant.

(b) Performance Determination regarding Contamination of Heat Exchanger or the like An example of the performance determination regarding contamination of a heat exchanger or the like of the air conditioning apparatus 100 will be described.

The performance determination regarding contamination of a heat exchanger or the like of the air conditioning apparatus 100 includes determination of clogging of the heat-source-side heat exchanger 23, and determination of clogging of an air filter disposed in the use-side heat exchanger 52 and/or the use unit 50. An air filter disposed in the use unit 50 is a member for preventing dust or the like from adhering to the use-side heat exchanger 52. A state in which the heat exchanger 23 or 52 is clogged refers to a state in which it is difficult for the air supplied by the fan 28 or 53 to pass through the heat exchanger 23 or 52 because the air flow path of the heat exchanger 23 or 52 is narrowed or blocked due to dust or the like adhering to the heat exchanger 23 or 52. A state in which the air filter is clogged refers to a state in which it is difficult for the air supplied by the fan 53 to pass through the air filter due to dust or the like adhering to the air filter.

First, a determination-process operation of the air conditioning apparatus 100 (hereinafter referred to as the second operation), which is performed in the determination of clogging of the heat-source-side heat exchanger 23 of the air conditioning apparatus 100 (hereinafter referred to as performance determination regarding heat-source-side clogging, for simplicity of description), will be described.

In the second operation, the air conditioning control unit 630 preferably controls the flow direction switching mechanism 22 so that the state of the heat-source-side heat exchanger 23 becomes the first state in which the heat-source-side heat exchanger 23 functions as a condenser. In other words, the second operation is preferably an operation in which the refrigerant flows through the refrigerant circuit 10 in a direction similar to that during the cooling operation. In the second operation, furthermore, the air conditioning control unit 630 preferably controls the air conditioning apparatus 100 as follows.

In the second operation, the air conditioning control unit 630 controls the number of revolutions of the motor 21$a$ of the compressor 21 (in a case where the compressor 21 has variable capacity), the number of revolutions of the fan motor 28$a$ of the heat-source-side fan 28, and the opening degree of the electronic expansion valve serving as the expansion mechanism 25 so that the degree of subcooling and the degree of superheating have positive values (>0). The degree of subcooling is a value obtained by subtracting the temperature Tb of the refrigerant at the outlet of the heat-source-side heat exchanger 23 from the condensation temperature Tc. The degree of superheating is a value obtained by subtracting the evaporation temperature Te from the refrigerant temperature at the outlet of the use-side heat exchanger 52. The number of revolutions of the fan motor 28$a$ of the heat-source-side fan 28 is preferably controlled to a predetermined value as small as possible so long as the degree of subcooling and the degree of superheating can have positive values.

Next, a determination-process operation of the air conditioning apparatus 100 (hereinafter referred to as the third operation), which is performed in the determination of clogging of an air filter disposed in the use-side heat exchanger 52 and/or the use unit 50 (hereinafter referred to as performance determination regarding use-side clogging, for simplicity of description), will be described.

In the third operation, the air conditioning control unit 630 preferably controls the flow direction switching mechanism 22 so that the state of the heat-source-side heat exchanger 23 becomes the first state in which the heat-source-side heat exchanger 23 functions as a condenser. In other words, the third operation is preferably an operation in which the refrigerant flows through the refrigerant circuit 10 in a direction similar to that during the cooling operation. In the third operation, furthermore, the air conditioning control unit 630 preferably controls the air conditioning apparatus 100 as follows.

In the third operation, the air conditioning control unit 630 controls the number of revolutions of the motor 21$a$ of the compressor 21 (in a case where the compressor 21 has variable capacity), the number of revolutions of the fan motor 28$a$ of the heat-source-side fan 28, and the opening degree of the electronic expansion valve serving as the expansion mechanism 25 so that the degree of subcooling and the degree of superheating have positive values (>0). The degree of subcooling is a value obtained by subtracting the temperature Tb of the refrigerant at the outlet of the heat-source-side heat exchanger 23 from the condensation temperature Tc. The degree of superheating is a value obtained by subtracting the evaporation temperature Te from the refrigerant temperature at the outlet of the use-side heat exchanger 52. The number of revolutions of the fan motor 53a of the fan 53 is preferably controlled to a relatively small predetermined value.

In the performance determination regarding heat-source-side clogging, when the second operation is performed and the air conditioning apparatus 100 enters the predetermined operating state, the determination processing unit 640 acquires a first heat-exchange temperature difference and a first quantity of heat exchange Q1 as determination index values. For example, when the second operation is performed and the values of the respective state quantities of the air conditioning apparatus 100 become substantially constant values, the determination processing unit 640 acquires the first heat-exchange temperature difference and the first quantity of heat exchange Q1 as determination index values. For example, specifically, when the air conditioning apparatus 100 enters the predetermined operating state, the determination processing unit 640 acquires, as information, the measurement value (the discharge pressure Pd) of the discharge pressure sensor 30, the measurement value (the suction pressure Ps) of the suction pressure sensor 31, the measurement value (the suction temperature Ts) of the suction temperature sensor 32, the measurement value (the discharge temperature Td) of the discharge temperature sensor 33, the measurement value of the heat-exchange temperature sensor 34, the measurement value of the liquid-side temperature sensor 35, and the number of revolutions N of the motor 21a of the compressor 21. Then, the determination processing unit 640 acquires, as a determination index value, the first heat-exchange temperature difference obtained by subtracting a heat-source air temperature from the condensation temperature (for example, the measurement value of the heat-exchange temperature sensor 34). When outside air temperature information is transmitted from a thermostat, the transmitted outside air temperature information is used as the heat-source air temperature. Alternatively, the heat-source air temperature may instead be a predetermined value determined in advance. Alternatively, the heat-source air temperature may be measured by an outside air temperature sensor (not illustrated) disposed in the air conditioning apparatus 100. Further, the determination processing unit 640 acquires, as a determination index value, the first quantity of heat exchange Q1 calculated by the following equation.

$$Q1 = G \times \Delta hc = f(Pd, Ps, Ts, N) \times (hc_{in} - hc_{out}) \quad \text{(Equation 1)}$$

Here, G denotes the amount of refrigerant circulation in the refrigerant circuit 10, and $\Delta hc$ denotes the difference between an inlet-side enthalpy $hc_{in}$ of the heat-source-side heat exchanger 23 and an outlet-side enthalpy $hc_{out}$ of the heat-source-side heat exchanger 23. The inlet-side enthalpy $hc_{in}$ is calculated on the basis of the characteristics of the refrigerant and the temperature and pressure on the inlet side of the heat-source-side heat exchanger 23. The outlet-side enthalpy $hc_{out}$ is calculated on the basis of the characteristics of the refrigerant and the temperature and pressure on the outlet side of the heat-source-side heat exchanger 23. The function f(Pd, Ps, Ts, N) is an expression based on the characteristics and the like of the compressor 21 and is an expression for calculating the amount of refrigerant circulation G using the discharge pressure Pd, the suction pressure Ps, the suction temperature Ts, and the number of revolutions N of the motor 21a as variables.

The determination processing unit 640 determines performance regarding clogging on the heat source side of the air conditioning apparatus 100 on the basis of the first heat-exchange temperature difference and the first quantity of heat exchange Q1 as the acquired determination index values. If the first quantity of heat exchange Q1 is small in view of the first heat-exchange temperature difference, the determination processing unit 640 determines that clogging has occurred in the heat-source-side heat exchanger 23. For example, if the first quantity of heat exchange Q1 is smaller than a reference determined for the value of the first heat-exchange temperature difference, the determination processing unit 640 determines that clogging has occurred in the heat-source-side heat exchanger 23.

In the performance determination regarding use-side clogging, when the third operation is performed and the air conditioning apparatus 100 enters the predetermined operating state, the determination processing unit 640 acquires a second heat-exchange temperature difference and a second quantity of heat exchange Q2 as determination index values. For example, when the third operation is performed and the values of the respective state quantities of the air conditioning apparatus 100 become substantially constant values, the determination processing unit 640 acquires the second heat-exchange temperature difference and the second quantity of heat exchange Q2 as determination index values. For example, when the air conditioning apparatus 100 enters the predetermined operating state, the determination processing unit 640 acquires, as information, the measurement value (the discharge pressure Pd) of the discharge pressure sensor 30, the measurement value (the suction pressure Ps) of the suction pressure sensor 31, the measurement value (the suction temperature Ts) of the suction temperature sensor 32, the measurement value of the liquid-side temperature sensor 54, the measurement value of the gas-side temperature sensor 55, and the number of revolutions N of the motor 21a of the compressor 21. Then, the determination processing unit 640 acquires, as a determination index value, the second heat-exchange temperature difference obtained by subtracting the evaporation temperature (for example, the evaporation temperature Te calculated from the suction pressure Ps) from the indoor temperature. When indoor temperature information is transmitted from a thermostat, the transmitted indoor temperature information is used as the indoor temperature. Alternatively, the indoor temperature may instead be a predetermined value determined in advance. Alternatively, the indoor temperature may be measured by an indoor temperature sensor (not illustrated) disposed in the air conditioning apparatus 100. Further, the determination processing unit 640 acquires, as a determination index value, the second quantity of heat exchange Q2 calculated by the following equation.

$$Q2 = G \times \Delta he = f(Pd, Ps, Ts, N) \times (he_{out} - he_{in}) \quad \text{(Equation 2)}$$

Here, G denotes the amount of refrigerant circulation in the refrigerant circuit 10, and $\Delta he$ denotes the difference between an outlet-side enthalpy $he_{out}$ of the use-side heat exchanger 52 and an inlet-side enthalpy $he_{in}$ of the use-side heat exchanger 52. The outlet-side enthalpy $he_{out}$ is calculated on the basis of the characteristics of the refrigerant and the temperature and pressure on the outlet side of the use-side heat exchanger 52. The inlet-side enthalpy $he_{in}$ is calculated on the basis of the characteristics of the refrigerant and the temperature and pressure on the inlet side of the use-side heat exchanger 52. The function f(Pd, Ps, Ts, N) is an expression based on the characteristics and the like of the compressor 21 and is an expression for calculating the amount of refrigerant circulation G using the discharge pressure Pd, the suction pressure Ps, the suction temperature Ts, and the number of revolutions N of the motor 21a as variables.

The determination processing unit 640 determines clogging on the use side of the air conditioning apparatus 100 on the basis of the second heat-exchange temperature difference and the second quantity of heat exchange Q2 as the acquired determination index values. If the second quantity of heat exchange Q2 is small in view of the second heat-exchange temperature difference, the determination processing unit 640 determines that clogging has occurred in the air filter disposed in the use-side heat exchanger 52 and/or the use unit 50. For example, if the second quantity of heat exchange Q2 is smaller than a reference determined for the value of the second heat-exchange temperature difference, the determination processing unit 640 determines that clogging has occurred in the air filter disposed in the use-side heat exchanger 52 and/or the use unit 50.

At time of the initial performance determination for the performance determination regarding heat-source-side clogging and the performance determination regarding use-side clogging, in other words, at the time of determination of the initial performance, the determination processing unit 640 uses a default reference value as the reference. At the time of the second and subsequent performance determinations, the determination processing unit 640 may use, as the reference, a value obtained at the time of the initial performance determination. Also at the time of the second and subsequent performance determinations, the determination processing unit 640 may use the default reference value as the reference.

In a case where the determination processing unit 640 determines that clogging has occurred on the heat source side or the use side, the determination processing unit 640 preferably notifies the user of the air conditioning apparatus 100 or the installation worker, the maintenance worker, or the like of the air conditioning apparatus 100 of the occurrence of clogging. For example, the determination processing unit 640 preferably causes the display (not illustrated) to display information notifying the occurrence of clogging on the heat source side or the use side. Alternatively, the determination processing unit 640 may notify a mobile terminal or the like held by the installation worker, the maintenance worker, or the like of the air conditioning apparatus 100 of the occurrence of clogging on the heat source side or the use side.

(c) Performance Determination regarding Failure

An example of the performance determination regarding a failure of the air conditioning apparatus 100 will be described. A failure of the air conditioning apparatus 100 described here refers to a state in which the capacity of the air conditioning apparatus 100 is significantly lower than the capacity to be achieved by the air conditioning apparatus 100.

The control of the operation of the various devices of the air conditioning apparatus 100, which is performed by the air conditioning control unit 630 in a determination-process operation of the air conditioning apparatus 100 performed in the determination of a failure of the air conditioning apparatus 100, is similar in content to that during the normal cooling operation or heating operation. Here, a description will be given of, as an example, a case where the determination-process operation is similar to the normal cooling operation.

After the lapse of a reference time from the start of the determination-process operation of the air conditioning apparatus 100, the determination processing unit 640 acquires the indoor temperature as a determination index value. The indoor temperature is implemented using indoor temperature information transmitted from the thermostat 900B or 900C and received by the communication unit 620. Alternatively, the indoor temperature may be measured by an indoor temperature sensor (not illustrated) disposed in the air conditioning apparatus 100. In a case where a thermostat connected to the connection unit 610 is of a type that does not transmit indoor temperature information, such as thermostat 900A, and the controller 60 does not include a means for acquiring the indoor temperature, the determination processing unit 640 may not perform the performance determination regarding a failure described here.

The determination processing unit 640 determines a failure of the air conditioning apparatus 100 on the basis of the indoor temperature as a determination index value. For example, in a case where the indoor temperature is not decreased to a predetermined reference (reference temperature), the determination processing unit 640 determines that the air conditioning apparatus 100 has failed.

In a case where the determination processing unit 640 determines that the air conditioning apparatus 100 has failed, the determination processing unit 640 preferably notifies the user of the air conditioning apparatus 100 or the installation worker, the maintenance worker, or the like of the air conditioning apparatus 100 of the failure. For example, the determination processing unit 640 preferably causes the display (not illustrated) to display information notifying the failure. Alternatively, the determination processing unit 640 may notify a mobile terminal or the like held by the installation worker, the maintenance worker, or the like of the air conditioning apparatus 100 of the failure.

(3-6-2) Example in which how Information from Thermostat is Handled is Changed Between Determination Processing Time and Non-Determination Processing Time An example will be described in which the air conditioning system 300 changes a method for using information received by the communication unit 620 from the thermostat 900A, 900B, or 900C between a determination processing time over which the performance determination process is performed and a non-determination processing time over which the performance determination process is not performed.

The determination processing time over which the performance determination process is performed refers to a period from satisfaction of the condition for performing a performance determination process to completion of the performance determination. In other words, the determination processing time over which the performance determination process is performed refers to a period from setting of the flag indicating that the condition for performing a performance determination process is satisfied to clearing of the flag indicating that the condition for performing a performance determination process is satisfied. The non-determination processing time over which the performance determination process is not performed refers to a period other than the determination processing time.

For example, the air conditioning system 300 changes a method for using an operation command, which is an example of information received by the communication unit 620 from the thermostat 900A, 900B, or 900C, between the determination processing time over which the performance determination process is performed and the non-determination processing time over which the performance determination process is not performed, as follows.

Figure 8:
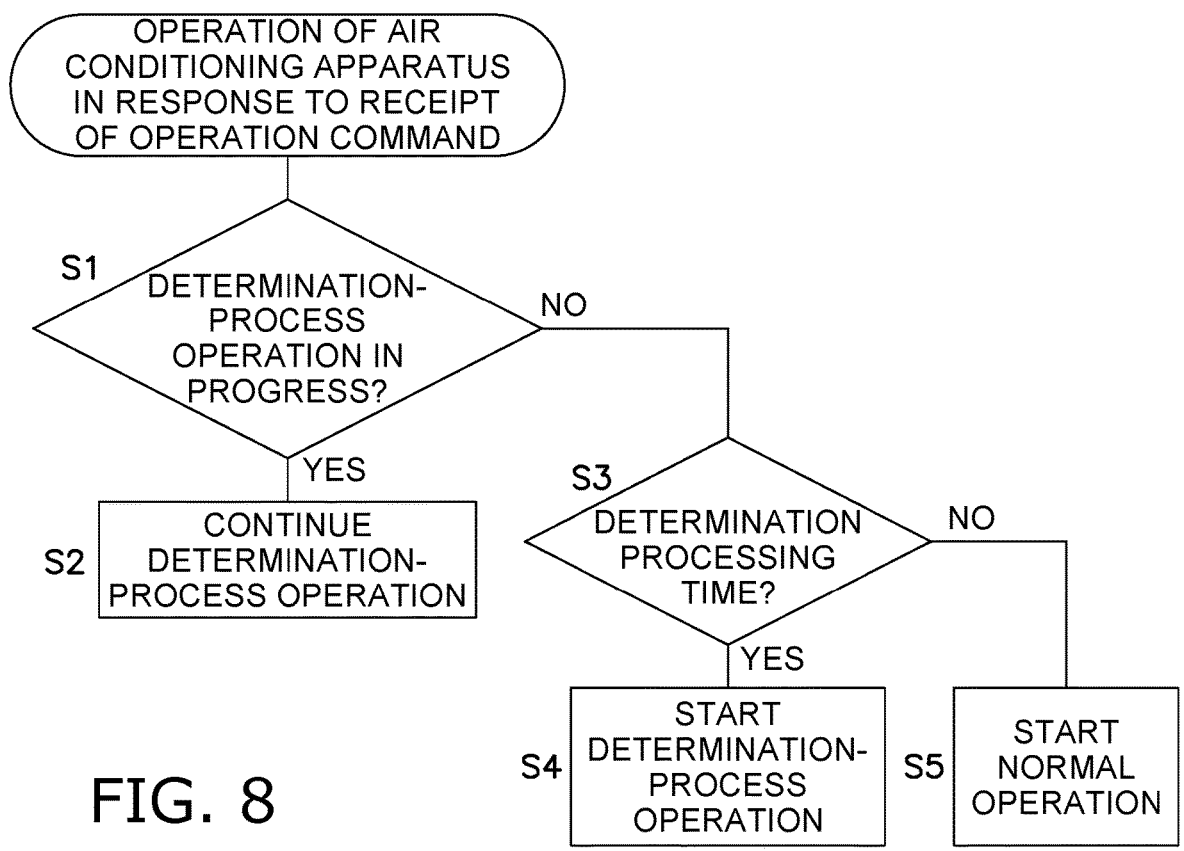
FIG. 8 is a flowchart illustrating an example of difference in a method for using an operation command from a thermostat between a determination processing time and a non-determination processing time for the performance of the air conditioning system.

In a case where the information received by the communication unit 620 from the thermostat 900A, 900B, or 900C is an operation command, the air conditioning apparatus 100 starts the normal operation. In other words, if the information received by the communication unit 620 from the thermostat 900A, 900B, or 900C is an operation command for providing an instruction to execute the cooling operation, the air conditioning apparatus 100 starts the normal cooling operation. If the information received by the communication unit 620 from the thermostat 900A, 900B, or 900C is an operation command for providing an instruction to execute the heating operation, the air conditioning apparatus 100 starts the normal heating operation. In the determination processing time, however, even if the information received by the communication unit 620 from the thermostat 900A, 900B, or 900C is an operation command, the air conditioning apparatus 100 performs the determination-process operation. A further description will be given with reference to a flowchart in FIG. 8.

When the communication unit 620 receives an operation command, the air conditioning control unit 630 of the air conditioning apparatus 100 determines whether the various devices of the air conditioning apparatus 100 are being caused to perform the determination-process operation (step S1). In other words, when the communication unit 620 receives an operation command, the air conditioning control unit 630 determines whether the operating mode of the air conditioning apparatus 100 is currently the determination-process operating mode.

If the operating mode of the air conditioning apparatus 100 is the determination-process operating mode, the air conditioning control unit 630 continuously causes the determination-process operation to be performed until the performance determination is completed (step S2). Although not illustrated, when the performance determination performed by the determination processing unit 640 is completed, the air conditioning control unit 630 starts the normal operation of the air conditioning apparatus 100 in accordance with the operation command from the thermostat 900A, 900B, or 900C.

On the other hand, if the operating mode of the air conditioning apparatus 100 is not the determination-process operating mode, the air conditioning control unit 630 determines whether the current time is the determination processing time (step S3). In other words, the air conditioning control unit 630 determines whether the flag indicating that the condition for performing a performance determination process is satisfied is currently set.

If the current time is the determination processing time, the air conditioning control unit 630 sets the operating mode of the air conditioning apparatus 100 to the process operating mode at a predetermined timing and starts the determination-process operation (step S4). Although not illustrated, after step S4 is performed, when the performance determination performed by the determination processing unit 640 is completed, the air conditioning control unit 630 starts the normal operation of the air conditioning apparatus 100 in accordance with the operation command from the thermostat 900A, 900B, or 900C.

On the other hand, if it is determined in step S3 that the current time is not the determination processing time, in other words, if it is determined in step S3 that the current time is the non-determination processing time, the air conditioning control unit 630 starts the normal operation of the air conditioning apparatus 100 (step S5).

This configuration prevents information (operation command) transmitted from the thermostat 900A, 900B, or 900C from hampering the execution of the performance determination of the air conditioning apparatus 100.

For example, the air conditioning system 300 changes a method for using a stop command, which is an example of information received by the communication unit 620 from the thermostat 900A, 900B, or 900C, between the determination processing time over which the performance determination process is performed and the non-determination processing time over which the performance determination process is not performed, as follows.

In a case where the information received by the communication unit 620 from the thermostat 900A, 900B, or 900C is a stop command, the air conditioning apparatus 100 stops the normal operation. In other words, if the information received by the communication unit 620 from the thermostat 900A, 900B, or 900C is a stop command for providing an instruction to stop the cooling operation, the air conditioning apparatus 100 stops the cooling operation. If the information received by the communication unit 620 from the thermostat 900A, 900B, or 900C is a stop command for providing an instruction to stop the heating operation, the air conditioning apparatus 100 stops the heating operation. In a case where the information received by the communication unit 620 from the thermostat 900A, 900B, or 900C is a stop command, the air conditioning apparatus 100 stops a refrigeration cycle operation. The refrigeration cycle operation is an operation in which the compressor 21 is operated to circulate refrigerant in the refrigerant circuit 10.

Figure 9:
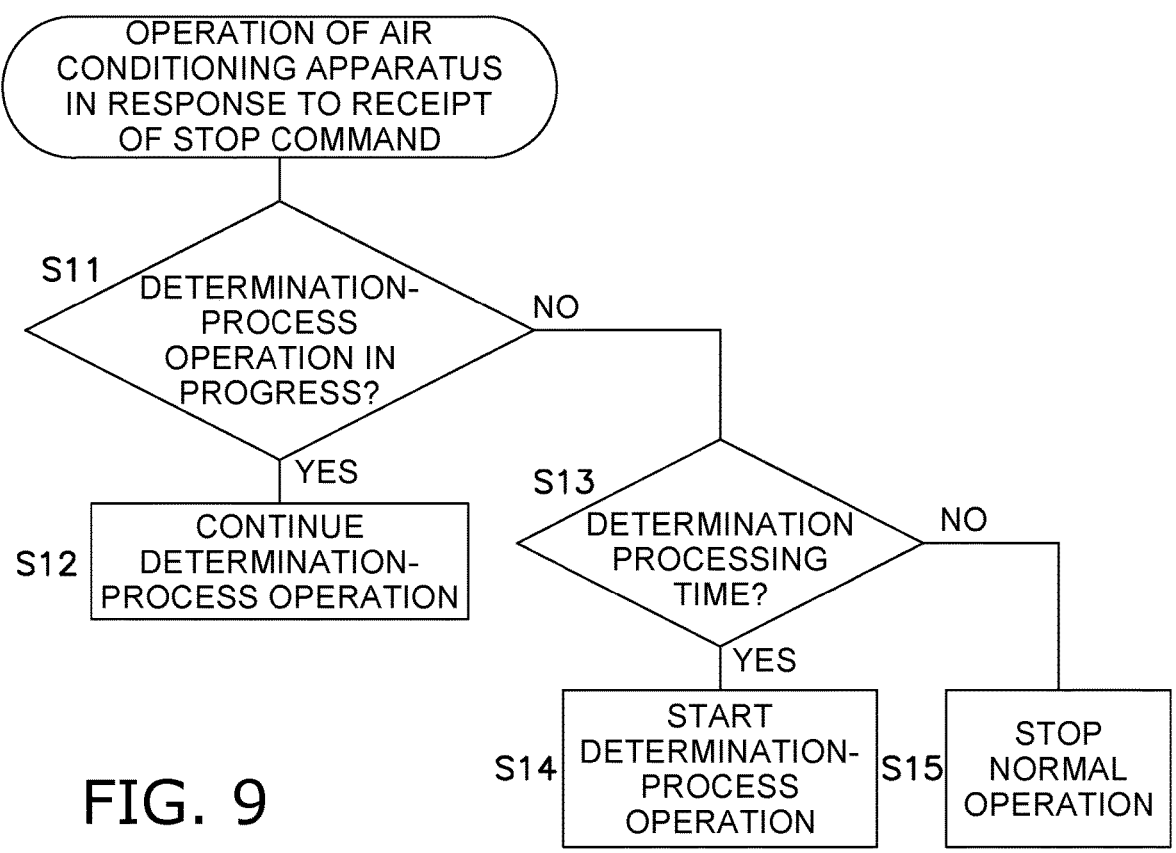
FIG. 9 is a flowchart illustrating an example of difference in a method for using a stop command from a thermostat between a determination processing time and a non-determination processing time for the performance of the air conditioning system.

In the determination processing time, however, even if the information received by the communication unit 620 from the thermostat 900A, 900B, or 900C is a stop command, the air conditioning apparatus 100 performs the determination-process operation. The determination-process operation is an operation in which the compressor 21 is operated to circulate refrigerant in the refrigerant circuit 10. In other words, in the determination processing time, even if the information received by the communication unit 620 from the thermostat 900A, 900B, or 900C is a stop command, the air conditioning apparatus 100 does not stop the refrigeration cycle operation. A further description will be given with reference to a flowchart in FIG. 9.

When the communication unit 620 receives a stop command, the air conditioning control unit 630 of the air conditioning apparatus 100 determines whether the various devices of the air conditioning apparatus 100 are being caused to perform the determination-process operation (step S11). In other words, when the communication unit 620 receives a stop command, the air conditioning control unit 630 determines whether the operating mode of the air conditioning apparatus 100 is currently the determination-process operating mode.

If the operating mode of the air conditioning apparatus 100 is the determination-process operating mode, the air conditioning control unit 630 continuously causes the determination-process operation to be performed until the performance determination is completed (step S12). Although not illustrated, when the performance determination performed by the determination processing unit 640 is completed, the air conditioning control unit 630 stops the operation of the air conditioning apparatus 100. In other words, when the performance determination performed by the determination processing unit 640 is completed, the air conditioning control unit 630 stops the refrigeration cycle operation of the air conditioning apparatus 100.

On the other hand, if the operating mode of the air conditioning apparatus 100 is not the determination-process operating mode, the air conditioning control unit 630 determines whether the current time is the determination processing time (step S13). In other words, the air conditioning control unit 630 determines whether the flag indicating that the condition for performing a performance determination process is satisfied is currently set.

If the current time is the determination processing time, the air conditioning control unit 630 sets the operating mode of the air conditioning apparatus 100 to the process operating mode at a predetermined timing and starts the determination-process operation (step S14). For example, when the air conditioning apparatus 100 is in the normal operation, the air conditioning control unit 630 stops the normal operation of the air conditioning apparatus 100, sets the operating mode of the air conditioning apparatus 100 to the process operating mode, and starts the determination-process operation. Although not illustrated, when the performance determination process performed by the determination processing unit 640 is completed after step S14 is performed, the air conditioning control unit 630 stops the operation of the air conditioning apparatus 100. In other words, when the performance determination performed by the determination processing unit 640 is completed, the air conditioning control unit 630 stops the refrigeration cycle operation of the air conditioning apparatus 100.

On the other hand, if it is determined in step S13 that the current time is not the determination processing time, in other words, if it is determined in step S13 that the current time is the non-determination processing time, the air conditioning control unit 630 stops the normal operation of the air conditioning apparatus 100 (step S15).

This configuration prevents information (stop command) transmitted from the thermostat 900A, 900B, or 900C from hampering the execution of the performance determination of the air conditioning apparatus 100.

(3-6-3) Example in which Performance Determination Process Differs in Accordance with Difference in Type of Thermostat Connected to Air Conditioning System Next, an example will be described in which the performance determination process differs in accordance with the difference in the type of the thermostat 900A, 900B, or 900C connected to the air conditioning system 300 will be described. The performance determination process described here includes all of the processes performed by the determination processing unit 640 in a period from when the condition for performing performance determination is satisfied to when the performance determination is completed. In other words, the performance determination process includes the processes performed by the determination processing unit 640 in the determination processing time, and the overall operation of the air conditioning apparatus 100 that the determination processing unit 640 causes the air conditioning control unit 630 to perform.

The determination processing unit 640 performs different performance determination processes according to whether the first thermostat 900A is connected to the connection unit 610, the second thermostat 900B is connected to the connection unit 610, or when the third thermostat 900C is connected to the connection unit 610. The performance determination processes being different mean that the performance determination processes are different in at least one of the following: whether to perform a preparatory operation of the air conditioning apparatus 100 before the determination-process operation is started, the content of the preparatory operation of the air conditioning apparatus 100, a condition for starting the determination-process operation, a process flow of the performance determination process, and an item to be determined by the performance determination process. The preparatory operation of the air conditioning apparatus 100 before the determination-process operation is started refers to an operation that the determination processing unit 640 instructs the air conditioning control unit 630 to perform separately from the determination-process operation and that is performed before the determination-process operation under different operating conditions from those of the determination-process operation.

The series of performance determination processes of the determination processing unit 640 when the thermostat 900A is connected to the connection unit 610, when the thermostat 900B is connected to the connection unit 610, and when the thermostat 900C is connected to the connection unit 610 will be described. The process flow described below is an example, and the process flow is not limited thereto. For example, in the process flow described below, the order of the steps may be changed as appropriate, and a plurality of steps may be performed simultaneously, so long as no contradiction occurs.

(a) Case where First Thermostat is Connected

Figure 10:
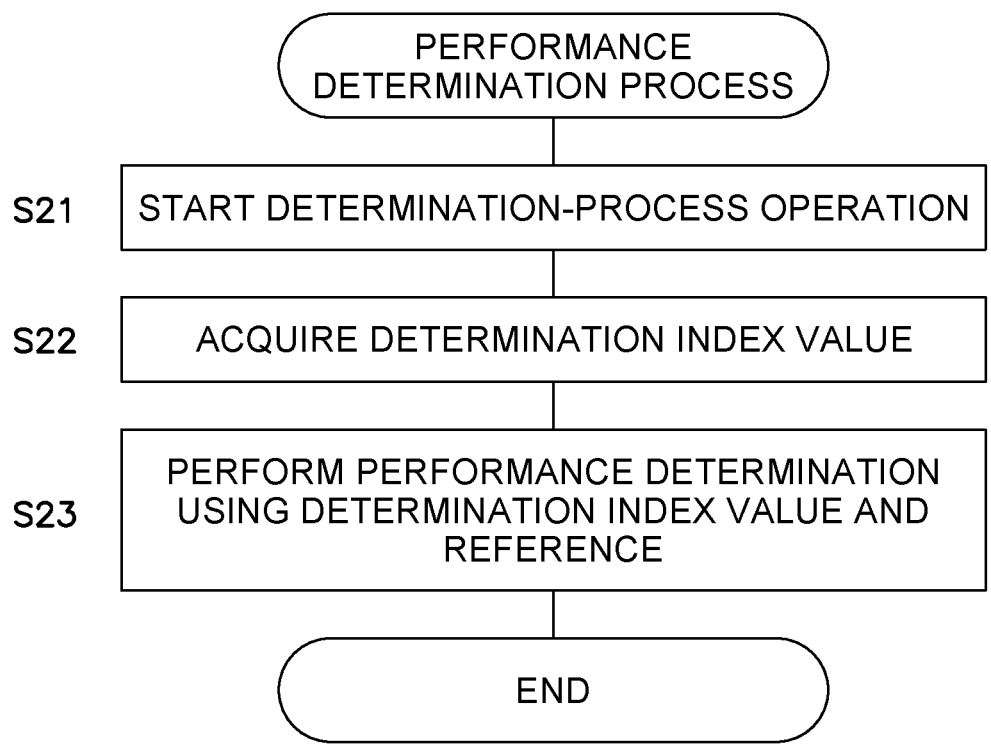
FIG. 10 is an example of flowchart of a performance determination process for describing a difference in the performance determination process caused in accordance with the type of thermostat connected to the air conditioning system, and is a flowchart in a case where the first thermostat is connected to the air conditioning system.

The series of performance determination processes performed by the determination processing unit 640 in a case where the first thermostat 900A is connected to the connection unit 610 will be described with reference to a flowchart in FIG. 10.

The first thermostat 900A does not transmit indoor temperature information. Thus, in a case where the air conditioning apparatus 100 is not provided with an indoor temperature sensor, the determination processing unit 640 may not perform the performance determination regarding a failure using the method described above.

For example, when an instruction is given from an operation device such as a remote controller (not illustrated) of the air conditioning apparatus 100 to perform the performance determination of the air conditioning apparatus 100, or, for example, when a predetermined period has elapsed since the previous performance determination of the air conditioning apparatus 100, the determination processing unit 640 determines that the condition for performing a performance determination process is satisfied. Then, the determination processing unit 640 starts the series of performance determination processes.

In a case where the first thermostat 900A is connected to the connection unit 610, if the determination processing unit 640 determines that the condition for performing a performance determination process is satisfied, the determination processing unit 640 immediately instructs the air conditioning control unit 630 to start the determination-process operation according to the performance-determination object (step S21).

Then, the determination processing unit 640 acquires the determination index value according to the performance-determination object at a predetermined timing after the determination-process operation is started (step S22).

Then, the determination processing unit 640 compares the determination index value with the reference and performs the performance determination (step S23).

(b) Case where Second Thermostat is Connected (b-1) First Example

A first example of the series of performance determination processes performed by the determination processing unit 640 in a case where the second thermostat 900B is connected to the connection unit 610 will be described with reference to the flowchart in FIG. 11.

For example, when an instruction is given from an operation device such as a remote controller (not illustrated) of the air conditioning apparatus 100 to perform the performance determination of the air conditioning apparatus 100, or, for example, when a predetermined period has elapsed since the previous performance determination of the air conditioning apparatus 100, the determination processing unit 640 determines that the condition for performing a performance determination process is satisfied. Then, the determination processing unit 640 starts the series of performance determination processes.

When performance determination is performed for a certain performance determination item of the air conditioning apparatus 100 for the first time (initial determination time), the process proceeds to step S32. At the time of the initial determination of the performance of the air conditioning apparatus 100 for a certain performance determination item, the outside air temperature (initial-determination-time outside air temperature), the indoor temperature (initial-determination-time indoor temperature), and the indoor humidity (initial-determination-time indoor humidity) at the initial determination time, the number of revolutions of the motor 21a of the compressor 21 (in the case of a variable-capacity compressor), the air volume derived from the number of revolutions of the motor 53a of the use-side fan 53, and so on are stored in a storage unit (not illustrated) of the controller 60.

When the performance determination for a certain performance determination item of the air conditioning apparatus 100 is performed for the second and subsequent times, if the determination processing unit 640 determines that the condition for performing a performance determination process is satisfied, the determination processing unit 640 determines whether a condition for starting the determination-process operation of the air conditioning apparatus 100 is satisfied for the outside air temperature (step S31). Specifically, the determination processing unit 640 determines whether the absolute value of a value obtained by subtracting the initial-determination-time outside air temperature from the outside air temperature transmitted from the second thermostat 900B is smaller than a predetermined value α (α>0) (step S31). If the absolute value of the value obtained by subtracting the initial-determination-time outside air temperature from the outside air temperature is smaller than the predetermined value α, the determination processing unit 640 determines that the condition for starting the determination-process operation of the air conditioning apparatus 100 is satisfied for the outside air temperature, and then the process proceeds to step S32. The determination of step S31 is repeatedly performed until it is determined that the absolute value of the value obtained by subtracting the initial-determination-time outside air temperature from the outside air temperature is smaller than the predetermined value α. Through this processing, the outside-temperature condition at the time of the second and subsequent performance determinations can be set to be substantially the same as the outside-temperature condition at the initial determination time.

In step S32, the determination processing unit 640 determines whether the condition for starting the determination-process operation of the air conditioning apparatus 100 is satisfied for the presence or absence of a person. Specifically, the determination processing unit 640 determines, from the presence information transmitted from the second thermostat 900B, whether a person is absent in the air-conditioning target space R. In a case where the determination processing unit 640 determines that a person is absent in the air-conditioning target space R, the determination processing unit 640 determines that the condition for starting the determination-process operation of the air conditioning apparatus 100 is satisfied for the presence or absence of a person, and then the process proceeds to step S33. If it is determined that a person is present in the air-conditioning target space R, the process returns to step S31. This processing reduces the discomfort of a person in the air-conditioning target space R, which is caused by changes in the indoor environment due to the influences of the determination-process operation.

In step S33, the determination processing unit 640 instructs the air conditioning control unit 630 to start the determination-process operation according to the performance-determination object.

Then, at a predetermined timing after the determination-process operation is started, the determination processing unit 640 acquires the determination index value according to the performance-determination object (step S34).

Then, if the performance determination regarding the amount of refrigerant, the performance determination regarding heat-source-side clogging, and the performance determination regarding a failure described above are performance determination items of the air conditioning apparatus 100, the process proceeds to step S36. If the performance determination item of the air conditioning apparatus 100 is the performance determination regarding use-side clogging and when performance determination is performed for the first time (initial determination time), the process proceeds to step S36.

On the other hand, if the performance determination item of the air conditioning apparatus 100 is the performance determination regarding use-side clogging and when performance determination is performed for the second and subsequent times, the process proceeds to step S35.

In step S35, the determination processing unit 640 corrects the reference used for the performance determination on the basis of the indoor temperature information and the indoor humidity information transmitted from the second thermostat 900B. Specifically, the determination processing unit 640 performs the following processing.

The determination processing unit 640 calculates the wet-bulb temperature in the air-conditioning target space R during the determination-process operation (first wet-bulb temperature) on the basis of the indoor temperature information and the indoor humidity information transmitted from the second thermostat 900B. Further, the determination processing unit 640 calculates the wet-bulb temperature in the air-conditioning target space R at the initial determination time (second wet-bulb temperature) on the basis of the indoor temperature and the indoor humidity at the initial determination time regarding use-side clogging, which are stored in the storage unit (not illustrated) of the controller 60. Then, the determination processing unit 640 corrects the evaporation temperature Te at the initial determination time by using a calculation equation using, as parameters, the difference between the first wet-bulb temperature and the second wet-bulb temperature, the amount of refrigerant circulation in the refrigerant circuit 10, which is determined from the number of revolutions of the motor 21a at the initial determination time, the air volume of the use-side fan 53, which is determined from the number of revolutions of the motor 53a, and so on. Then, the determination processing unit 640 uses the reference calculated using the evaporation temperature Te for the performance determination regarding use-side clogging in step S36.

Here, the second thermostat 900B is a thermostat of a type that transmits indoor temperature information and indoor humidity information. However, in a case where the second thermostat 900B is a thermostat of a type that does not transmit indoor humidity information, the determination processing unit 640 assumes that the indoor humidity has a predetermined value (for example, 50%), and performs processing similar to that described above.

In step S36, the determination processing unit 640 performs performance determination using the determination index value acquired in step S34 and the reference.

Here, a description is given of, as an example, a case where the second thermostat 900B is a thermostat configured to transmit indoor temperature information, indoor humidity information, outside air temperature information, and presence information. In a case where the second thermostat 900B is a thermostat configured not to transmit all of the pieces of information, the processing step for the information that is not transmitted is omitted.

(b-2) Second Example

Figure 12:
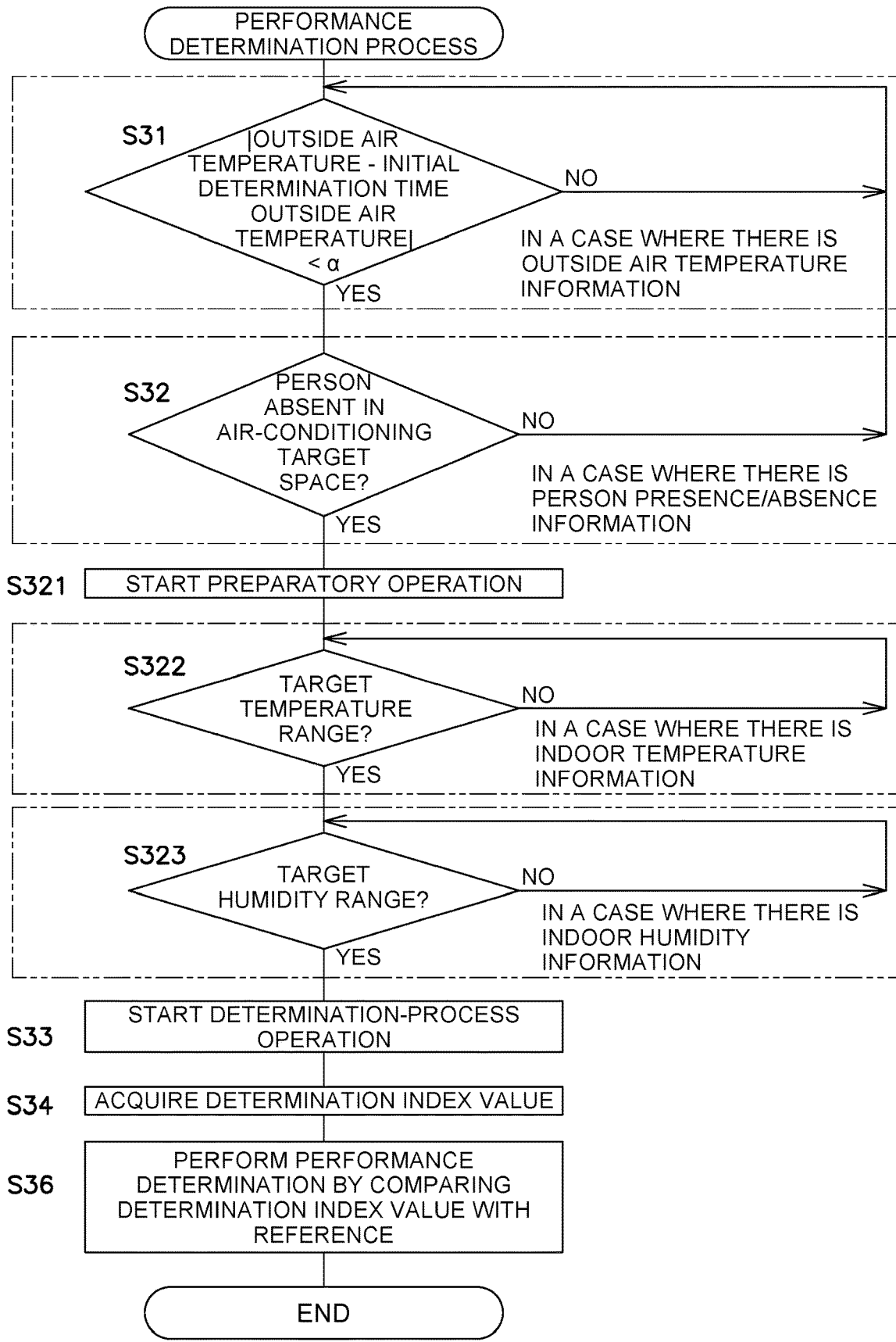
FIG. 12 is an example of flowchart of a performance determination process for describing a difference in the performance determination process caused in accordance with the type of thermostat connected to the air conditioning system, and is another example flowchart in a case where the second thermostat is connected to the air conditioning system.

A second example of the series of performance determination processes performed by the determination processing unit 640 in a case where the second thermostat 900B is connected to the connection unit 610 will be described with reference to a flowchart in FIG. 12.

For example, when an instruction is given from an operation device such as a remote controller (not illustrated) of the air conditioning apparatus 100 to perform the performance determination of the air conditioning apparatus 100, or, for example, when a predetermined period has elapsed since the previous performance determination of the air conditioning apparatus 100, the determination processing unit 640 determines that the condition for performing a performance determination process is satisfied. Then, the determination processing unit 640 starts the series of performance determination processes.

Figure 11:
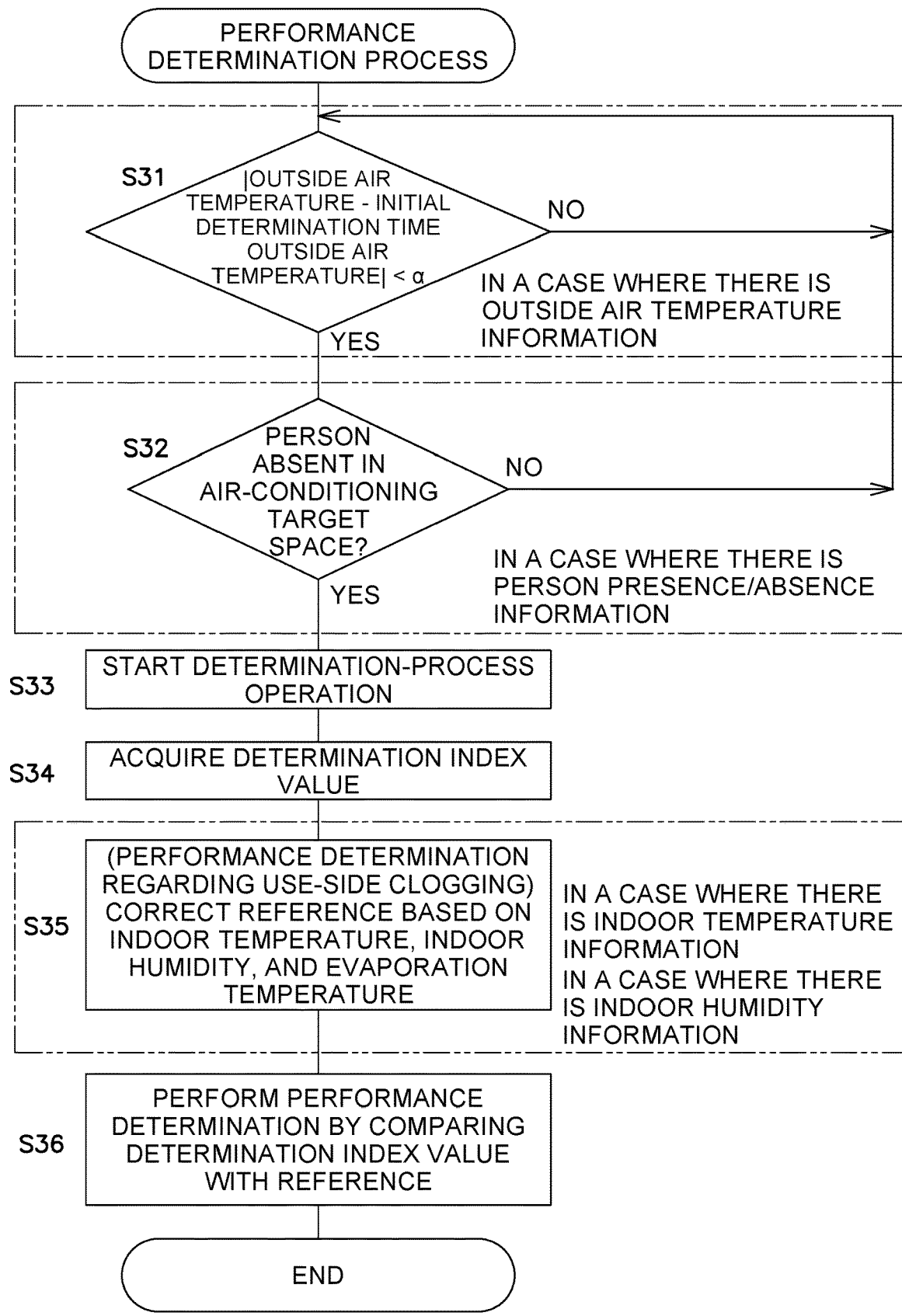
FIG. 11 is an example of flowchart of a performance determination process for describing a difference in the performance determination process caused in accordance with the type of thermostat connected to the air conditioning system, and is an example flowchart in a case where the second thermostat is connected to the air conditioning system.

The processing of step S31 and step S32 is similar to the processing of step S31 and step S32 in FIG. 11, and a description thereof is thus omitted.

In this example, if it is determined in step S32 that a person is absent in the air-conditioning target space R and when the determination processing unit 640 performs performance determination for a certain performance determination item of the air conditioning apparatus 100 for the first time (initial determination time), the process flow proceeds to step S33.

In this example, on the other hand, if it is determined in step S32 that a person is absent in the air-conditioning target space R and when the determination processing unit 640 performs performance determination for a certain performance determination item of the air conditioning apparatus 100 for the second and subsequent times, the process flow proceeds to step S321.

In step S321, the determination processing unit 640 instructs the air conditioning control unit 630 to start a preparatory operation. The preparatory operation described here is an operation of the air conditioning apparatus 100 for bringing the temperature and humidity of the air-conditioning target space R close to a target temperature and a target humidity. The target temperature and the target humidity described here are the indoor temperature and the indoor humidity at the time when performance determination is performed for the same performance determination item stored in the storage unit of the controller 60 for the first time (initial determination time).

In step S322, the determination processing unit 640 determines, based on the indoor temperature information transmitted from the second thermostat 900B, whether the indoor temperature is in a target temperature range. In other words, the determination processing unit 640 determines, based on the indoor temperature information transmitted from the second thermostat 900B, whether the indoor temperature is in a predetermined numerical value range relative to the target temperature. Step S322 is repeatedly performed until it is determined that the indoor temperature is in the target temperature range. If the determination processing unit 640 determines that the indoor temperature is in the target temperature range, the process proceeds to step S323.

In step S323, the determination processing unit 640 determines, based on the indoor humidity information transmitted from the second thermostat 900B, whether the indoor humidity is in a target humidity range. In other words, the determination processing unit 640 determines, based on the indoor humidity information transmitted from the second thermostat 900B, whether the indoor humidity is in a predetermined numerical value range relative to the target humidity. Step S322 is repeatedly performed until it is determined that the indoor humidity is in the target humidity range. If the determination processing unit 640 determines that the indoor humidity is in the target humidity range, the process proceeds to step S33.

Here, the preparatory operation is performed in the way as in step S321 to step S323, whereby the environment of the air-conditioning target space R is adjusted to be under conditions equivalent to those at the initial determination time. Accordingly, the performance determination of the air conditioning apparatus 100 can be performed based on the indoor temperature information and the indoor humidity information transmitted from the second thermostat 900B.

In step S33, the determination processing unit 640 instructs the air conditioning control unit 630 to start the determination-process operation according to the performance-determination object.

Then, at a predetermined timing after the determination-process operation is started, the determination processing unit 640 acquires the determination index value according to the performance-determination object (step S34). Then, the process proceeds to step S36.

In step S36, the determination processing unit 640 performs performance determination using the determination index value acquired in step S34 and the reference.

Here, a description is given of, as an example, a case where the second thermostat 900B is a thermostat configured to transmit indoor temperature information, indoor humidity information, outside air temperature information, and presence information. In a case where the second thermostat 900B is a thermostat configured not to transmit all of the pieces of information, the processing step for the information that is not transmitted is omitted.

(c) Case where Third Thermostat is Connected

Figure 13:
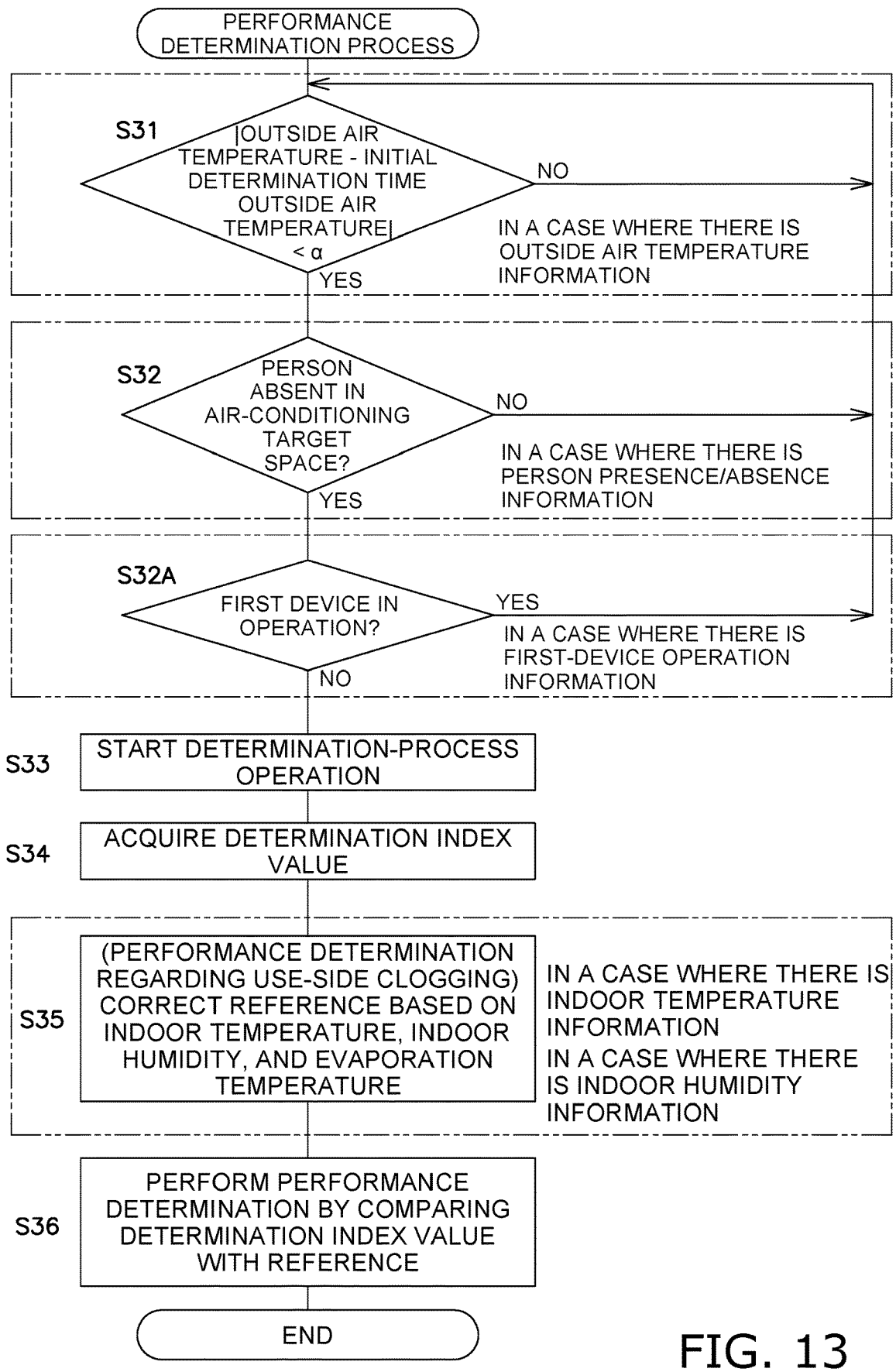
FIG. 13 is an example flowchart of a performance determination process for describing a difference in the performance determination process caused in accordance with the type of thermostat connected to the air conditioning system, and is a flowchart in a case where the third thermostat is connected to the air conditioning system.

An example of the series of performance determination processes performed by the determination processing unit 640 in a case where the third thermostat 900C is connected to the connection unit 610 will be described with reference to a flowchart in FIG. 13. The flowchart in FIG. 13 is substantially the same as the flowchart in FIG. 11. However, the flowchart in FIG. 13 is different from the flowchart in FIG. 11 in that step S32A is present between step S32 and step S33. Only the difference from the flowchart in FIG. 11 will be described here.

Step S32A is performed after Yes is determined in step S32. The determination processing unit 640 determines, based on the different-device operation information (information related to the operating state of the first device 200) transmitted from the third thermostat 900C, whether the first device 200 is in operation. In a case where the determination processing unit 640 determines that the first device 200 is in operation, the process returns to step S31. In a case where the determination processing unit 640 determines that the first device 200 is not in operation, the process proceeds to step S33.

The step S32A included in the performance determination process enables that the environment of the air-conditioning target space R generated by the operation of the first device 200 is prevented from being ruined.

(5) Features (5-1)

The air conditioning system 300 according to the embodiment described above includes the air conditioning apparatus 100, which is an example of a refrigeration cycle apparatus, the connection unit 610, the communication unit 620, and the determination processing unit 640. The air conditioning apparatus 100 performs air conditioning of the air-conditioning target space R. The connection unit 610 is connectable to the plurality of types of thermostats 900A, 900B, and 900C. The communication unit 620 performs communication with the thermostat 900A, 900B, or 900C connected to the connection unit 610. The determination processing unit 640 performs a performance determination process for the air conditioning apparatus 100.

The determination processing unit 640 performs different performance determination processes according to whether a first type of thermostat is connected to the connection unit 610 or when a second type of thermostat different from the first type of thermostat is connected to the connection unit 610. For example, the determination processing unit 640 performs different performance determination processes when the first thermostat 900A is connected to the connection unit 610 and when the second thermostat 900B or the third thermostat 900C is connected to the connection unit 610. Further, the determination processing unit 640 performs different performance determination processes when the second thermostat 900B is connected to the connection unit 610 and when the third thermostat 900C is connected to the connection unit 610.

Further, the air conditioning apparatus 100 changes a method for using information received by the communication unit 620 from the thermostat 900A, 900B, or 900C according to whether being in a determination processing time over which the performance determination process is performed or in a non-determination processing time over which the performance determination process is not performed. In other words, the air conditioning apparatus 100 changes how information received by the communication unit 620 from the thermostat 900A, 900B, or 900C is handled, between a determination processing time over which the performance determination process is performed and a non-determination processing time over which the performance determination process is not performed.

In the air conditioning system 300 according to this embodiment, it is possible to perform an appropriate performance determination process for the air conditioning apparatus 100, regardless of the information transmitted from the thermostat 900A, 900B, or 900C connected thereto.

(5-2)

In the air conditioning system 300 according to the embodiment described above, the second thermostat 900B is different from the first thermostat 900A in terms of at least one of whether to transmit the temperature information of the air-conditioning target space R to the communication unit 620, whether to transmit the humidity information of the air-conditioning target space R to the communication unit 620, and whether to transmit the temperature information of the heat-source air of the air conditioning apparatus 100 to the communication unit 620. In this embodiment, the second thermostat 900B is different from the first thermostat 900A in terms of all of whether to transmit the temperature information of the air-conditioning target space R to the communication unit 620, whether to transmit the humidity information of the air-conditioning target space R to the communication unit 620, and whether to transmit the temperature information of the heat-source air of the air conditioning apparatus 100 to the communication unit 620.

In the air conditioning system 300 according to this embodiment, it is possible to perform an appropriate performance determination process in accordance with the information transmitted from the thermostat 900A or 900B connected thereto.

(5-3)

In the air conditioning system 300 according to the embodiment described above, the third thermostat 900C is different from the second thermostat 900B in terms of whether to transmit to the communication unit 620 information related to the operating state of the first device 200, which is an example of an air conditioning device different from the air conditioning apparatus 100 and which performs air conditioning of the same space as the air-conditioning target space R.

In the air conditioning system 300 according to the embodiment described above, it is possible to perform an appropriate performance determination process in accordance with whether the thermostat 900B or 900C connected to the air conditioning system 300 transmits the operating state of the first device 200 connected to the thermostat 900B or 900C.

(5-4)

In the air conditioning system 300 according to the embodiment described above, the second thermostat 900B is different from the first thermostat 900A in terms of whether to transmit information related to the presence of a person in the air-conditioning target space R to the communication unit 620.

In the air conditioning system 300 according to the embodiment described above, it is possible to perform an appropriate performance determination process in accordance with whether the thermostat 900A or 900B connected thereto notifies the presence of a person in the air-conditioning target space R.

(5-5)

In the air conditioning system 300 according to the embodiment described above, the determination processing unit 640 performs different performance determination processes according to whether the first type of thermostat is connected to the connection unit 610 or when the second type of thermostat is connected to the connection unit 610. The recitation "a certain performance determination process is different from another performance determination process" indicates that at least one of whether to perform a preparatory operation, content of the preparatory operation, a condition for starting the determination-process operation, a process flow of the performance determination process, and an item to be determined by the performance determination process is changed between them.

In the air conditioning system 300 according to the embodiment described above, since the performance determination process is changed in accordance with the type of the thermostat 900A, 900B, or 900C connected thereto, it is possible to perform appropriate performance determination in accordance with the type of the thermostat 900A, 900B, or 900C.

(5-6)

In the air conditioning system 300 according to the embodiment described above, in a case where the communication unit 620 receives a stop command, which is an example of a refrigeration cycle stop command for the air conditioning apparatus 100, the air conditioning apparatus 100 stops the refrigeration cycle operation in the non-determination processing time. In a case where the communication unit 620 receives a stop command of the air conditioning apparatus 100, the air conditioning apparatus 100 performs a determination-process operation in which the refrigeration cycle operation is not stopped in the determination processing time. The determination-process operation is an operation of the air conditioning apparatus 100 for performing the performance determination process.

In the air conditioning system 300 according to the embodiment described above, the performance determination process can be executed without being hampered by a signal of the thermostat 900A, 900B, or 900C.

<Modifications>

Modifications of the embodiment described above will be described. The following modifications may be combined as appropriate so long as they do not contradict.

(1) Modification A

In the embodiment described above, the controller 60 receives information related to the operating state of the first device 200, and the determination processing unit 640 does not perform performance evaluation of the air conditioning apparatus 100 if the first device 200 is in operation. In another embodiment, the controller 60 may be configured to be capable of transmitting an operation instruction or a stop instruction to the first device 200 via a thermostat.

For example, in a case where the following conditions are satisfied, the controller 60 may transmit an operation instruction to the first device 200 via a thermostat when performing performance determination of the air conditioning apparatus 100.

1) A case where operating the first device 200 does not adversely affect the performance determination of the air conditioning apparatus 100, and operating the first device 200 brings the environment of the air-conditioning target space R close to a state in which the user of the air-conditioning target space R is comfortable.

2) A case where operating the first device 200 makes the environment of the air-conditioning target space R conducive to the performance determination of the air conditioning apparatus 100.

(2) Modification B

In the embodiment described above, the air conditioning apparatus 100 uses air as the heat source. The refrigeration cycle apparatus may be an air conditioning apparatus that uses cooling water or hot water as the heat source. Also, the refrigeration cycle apparatus may be an apparatus that performs a refrigeration cycle operation to produce cold water or hot water, sends the cold water or hot water to a radiator, and performs air conditioning using the radiator.

<Supplementary Note>

While an embodiment of the present disclosure has been described, it will be understood that forms and details can be changed in various ways without departing from the spirit and scope of the present disclosure as recited in the claims.

REFERENCE SIGNS LIST

100 air conditioning apparatus (refrigeration cycle apparatus)
200 first device (air conditioning device different from refrigeration cycle apparatus)
300 air conditioning system
610 connection unit
620 communication unit
640 determination processing unit
900A, 900B, 900C thermostat
R air-conditioning target space

CITATION LIST

Patent Literature

PTL 1: Japanese Patent No. 5334909

The invention claimed is:

1. An air conditioning system comprising:
a refrigeration cycle apparatus that performs air conditioning of an air-conditioning target space (R); and
a controller that:
is connectable to a plurality of types of thermostats;
performs communication with a connected thermostat; and
performs a performance determination process for the refrigeration cycle apparatus, wherein
A) the controller performs different performance determination processes according to whether a first type of thermostat is connected to the controller or a second type of thermostat different from the first type of thermostat is connected to the controller, or
B) the refrigeration cycle apparatus changes a method for using information received by controller from the thermostat according to whether being in a determination processing time over which the performance determination process is performed or in a non-determination processing time over which the performance determination process is not performed.

2. The air conditioning system according to claim 1, wherein
the second type of thermostat is different from the first type of thermostat in terms of at least one of whether to transmit temperature information of the air-conditioning target space to the controller, whether to transmit humidity information of the air-conditioning target space to the controller, and whether to transmit temperature information of heat-source air of the refrigeration cycle apparatus to the controller.

3. The air conditioning system according to claim 2, wherein
the second type of thermostat is different from the first type of thermostat in terms of whether to transmit information related to an operating state of an air conditioning device to the controller, the air conditioning device being different from the refrigeration cycle apparatus and configured to perform air conditioning of the same space as the air-conditioning target space.

4. The air conditioning system according to claim 2, wherein
the second type of thermostat is different from the first type of thermostat in terms of whether to transmit information related to presence of a person in the air-conditioning target space to the controller.

5. The air conditioning system according to claim 2, wherein
the controller performs different performance determination processes according to whether the first type of thermostat is connected to the controller or the second type of thermostat is connected to the controller, by changing at least one of whether to perform a preparatory operation before a determination-process operation of the refrigeration cycle apparatus for performing the performance determination process is started, content of the preparatory operation, a condition for starting the determination-process operation, a process flow of the performance determination process, and an item to be determined by the performance determination process.

6. The air conditioning system according to claim 2, wherein
in a case where the controller receives a refrigeration cycle stop command for the refrigeration cycle apparatus, the refrigeration cycle apparatus stops a refrigeration cycle operation in the non-determination processing time and performs a determination-process operation for performing the performance determination process in which the refrigeration cycle operation is not stopped in the determination processing time.

7. The air conditioning system according to claim 1, wherein
the second type of thermostat is different from the first type of thermostat in terms of whether to transmit information related to an operating state of an air conditioning device to the controller, the air conditioning device being different from the refrigeration cycle apparatus and configured to perform air conditioning of the same space as the air-conditioning target space.

8. The air conditioning system according to claim 7, wherein
the second type of thermostat is different from the first type of thermostat in terms of whether to transmit information related to presence of a person in the air-conditioning target space to the controller.

9. The air conditioning system according to claim 7, wherein
the controller performs different performance determination processes according to whether the first type of thermostat is connected to the controller or the second type of thermostat is connected to the controller, by changing at least one of whether to perform a preparatory operation before a determination-process operation of the refrigeration cycle apparatus for performing the performance determination process is started, content of the preparatory operation, a condition for starting the determination-process operation, a process flow of the performance determination process, and an item to be determined by the performance determination process.

10. The air conditioning system according to claim 7, wherein
in a case where the controller receives a refrigeration cycle stop command for the refrigeration cycle apparatus, the refrigeration cycle apparatus stops a refrigeration cycle operation in the non-determination processing time and performs a determination-process operation for performing the performance determination process in which the refrigeration cycle operation is not stopped in the determination processing time.

11. The air conditioning system according to claim 1, wherein
the second type of thermostat is different from the first type of thermostat in terms of whether to transmit information related to presence of a person in the air-conditioning target space to the controller.

12. The air conditioning system according to claim 11, wherein
the controller performs different performance determination processes according to whether the first type of thermostat is connected to the controller or the second type of thermostat is connected to the controller, by changing at least one of whether to perform a preparatory operation before a determination-process operation of the refrigeration cycle apparatus for performing the performance determination process is started, content of the preparatory operation, a condition for starting the determination-process operation, a process flow of the performance determination process, and an item to be determined by the performance determination process.

13. The air conditioning system according to claim 11, wherein
in a case where the controller receives a refrigeration cycle stop command for the refrigeration cycle apparatus, the refrigeration cycle apparatus stops a refrigeration cycle operation in the non-determination processing time and performs a determination-process operation for performing the performance determination process in which the refrigeration cycle operation is not stopped in the determination processing time.

14. The air conditioning system according to claim 1, wherein
the controller performs different performance determination processes according to whether the first type of thermostat is connected to the controller or the second type of thermostat is connected to the controller, by changing at least one of whether to perform a preparatory operation before a determination-process operation of the refrigeration cycle apparatus for performing the performance determination process is started, content of the preparatory operation, a condition for starting the determination-process operation, a process flow of the performance determination process, and an item to be determined by the performance determination process.

15. The air conditioning system according to claim 14, wherein
in a case where the controller receives a refrigeration cycle stop command for the refrigeration cycle apparatus, the refrigeration cycle apparatus stops a refrigeration cycle operation in the non-determination processing time and performs a determination-process operation for performing the performance determination process in which the refrigeration cycle operation is not stopped in the determination processing time.

16. The air conditioning system according to claim 1, wherein
in a case where the controller receives a refrigeration cycle stop command for the refrigeration cycle apparatus, the refrigeration cycle apparatus stops a refrigeration cycle operation in the non-determination processing time and performs a determination-process operation for performing the performance determination process in which the refrigeration cycle operation is not stopped in the determination processing time.

* * * * *